(12) United States Patent
Paley et al.

(10) Patent No.: US 10,185,477 B1
(45) Date of Patent: Jan. 22, 2019

(54) METHOD AND SYSTEM FOR CONFIGURING AUTOMATIC GENERATION OF NARRATIVES FROM DATA

(71) Applicant: Narrative Science Inc., Chicago, IL (US)

(72) Inventors: Andrew R. Paley, Chicago, IL (US); Nathan D. Nichols, Chicago, IL (US); Kristian J. Hammond, Chicago, IL (US)

(73) Assignee: NARRATIVE SCIENCE INC., Chicago, IL (US)

( * ) Notice: Subject to any disclaimer, the term of this patent is extended or adjusted under 35 U.S.C. 154(b) by 94 days.

(21) Appl. No.: 14/211,444

(22) Filed: Mar. 14, 2014

Related U.S. Application Data

(60) Provisional application No. 61/799,328, filed on Mar. 15, 2013.

(51) Int. Cl.
 G06F 3/048 (2013.01)
 G06F 3/0484 (2013.01)
 G06F 3/0482 (2013.01)
 G06F 17/28 (2006.01)

(52) U.S. Cl.
 CPC ........ G06F 3/04842 (2013.01); G06F 3/0482 (2013.01); G06F 17/2881 (2013.01)

(58) Field of Classification Search
 CPC .... G06F 3/0481; G06F 17/2785; G06F 17/27; G06F 17/2775; G06F 17/30371; G06F 17/30598; G06F 17/30705; G06F 17/2881; G06F 17/30253; G06F 17/30528; G06F 17/30684; G06F 17/30654; G06F 17/2705; G06F 17/248; G06F 17/24; G06N 99/005; G06N 5/02

USPC .... 715/202, 209, 255, 730, 731, 256; 704/9, 704/257

See application file for complete search history.

(56) References Cited

U.S. PATENT DOCUMENTS

| | | | |
|---|---|---|---|
| 4,992,939 | A | 2/1991 | Tyler |
| 5,734,916 | A | 3/1998 | Greenfield et al. |
| 5,802,495 | A | 9/1998 | Goltra |
| 6,289,363 | B1 | 9/2001 | Consolatti et al. |

(Continued)

FOREIGN PATENT DOCUMENTS

WO  2006122329 A2  11/2006

OTHER PUBLICATIONS

Character Writer version 3.1, Typing Chimp Software LLC, 2012, screenshots from working program, pp. 1-19.*

(Continued)

Primary Examiner — Ajay M Bhatia
Assistant Examiner — Alex Olshannikov
(74) Attorney, Agent, or Firm — Thompson Coburn LLP

(57) ABSTRACT

The exemplary embodiments describe, inter alia, an apparatus comprising: a processor configured to (1) generate a plurality of graphical user interfaces (GUIs) for interaction with a user to support configuration of a narrative story generator to automatically generate a narrative story based on input data, wherein at least one of the GUIs presents content blocks comprising a story outline in a hierarchical structure, (2) evaluate configuration elements of the narrative story generated using imported sample data, and (3) generate narrative stories based on the configuration of the narrative story generator and the input data.

33 Claims, 46 Drawing Sheets

(56) References Cited

U.S. PATENT DOCUMENTS

| | | | |
|---|---|---|---|
| 6,968,316 | B1 | 11/2005 | Hamilton |
| 6,976,031 | B1* | 12/2005 | Toupal .................. G06F 17/248 |
| 7,246,315 | B1 | 7/2007 | Andrieu et al. |
| 7,333,967 | B1 | 2/2008 | Bringsjord et al. |
| 7,577,634 | B2 | 8/2009 | Ryan et al. |
| 7,610,279 | B2 | 10/2009 | Budzik et al. |
| 7,617,199 | B2 | 11/2009 | Budzik et al. |
| 7,617,200 | B2 | 11/2009 | Budzik et al. |
| 7,627,565 | B2 | 12/2009 | Budzik et al. |
| 7,644,072 | B2 | 1/2010 | Budzik et al. |
| 7,657,518 | B2 | 2/2010 | Budzik et al. |
| 7,716,116 | B2 | 5/2010 | Schiller |
| 7,778,895 | B1 | 8/2010 | Baxter et al. |
| 7,836,010 | B2 | 11/2010 | Hammond et al. |
| 7,840,448 | B2 | 11/2010 | Musgrove et al. |
| 7,856,390 | B2 | 12/2010 | Schiller |
| 7,865,496 | B1 | 1/2011 | Schiller |
| 8,046,226 | B2 | 10/2011 | Soble et al. |
| 8,355,903 | B1 | 1/2013 | Birnbaum et al. |
| 8,374,848 | B1 | 2/2013 | Birnbaum et al. |
| 8,447,604 | B1 | 5/2013 | Chang |
| 8,463,695 | B2 | 6/2013 | Schiller |
| 8,494,944 | B2 | 7/2013 | Schiller |
| 8,515,737 | B2 | 8/2013 | Allen |
| 8,630,844 | B1 | 1/2014 | Nichols et al. |
| 8,630,912 | B2 | 1/2014 | Seki et al. |
| 8,630,919 | B2 | 1/2014 | Baran et al. |
| 8,645,825 | B1* | 2/2014 | Cornea ............... G06F 17/3064 715/257 |
| 8,676,691 | B2 | 3/2014 | Schiller |
| 8,688,434 | B1 | 4/2014 | Birnbaum et al. |
| 8,775,161 | B1 | 7/2014 | Nichols et al. |
| 8,812,311 | B2 | 8/2014 | Weber |
| 8,843,363 | B2 | 9/2014 | Birnbaum et al. |
| 8,886,520 | B1 | 11/2014 | Nichols et al. |
| 8,892,417 | B1 | 11/2014 | Nichols et al. |
| 9,208,147 | B1 | 12/2015 | Nichols et al. |
| 9,251,134 | B2 | 2/2016 | Birnbaum et al. |
| 9,396,168 | B2 | 7/2016 | Birnbaum et al. |
| 9,396,758 | B2 | 7/2016 | Oz et al. |
| 9,697,178 | B1 | 7/2017 | Nichols et al. |
| 9,720,884 | B2 | 8/2017 | Birnbaum et al. |
| 2002/0083025 | A1 | 6/2002 | Robarts et al. |
| 2004/0138899 | A1 | 7/2004 | Birnbaum et al. |
| 2004/0255232 | A1 | 12/2004 | Hammond et al. |
| 2005/0027704 | A1 | 2/2005 | Hammond et al. |
| 2005/0028156 | A1 | 2/2005 | Hammond et al. |
| 2005/0125213 | A1 | 6/2005 | Chen et al. |
| 2005/0273362 | A1 | 12/2005 | Harris et al. |
| 2006/0031182 | A1 | 2/2006 | Ryan et al. |
| 2006/0101335 | A1 | 5/2006 | Pisciottano |
| 2006/0212446 | A1 | 9/2006 | Hammond et al. |
| 2006/0253783 | A1 | 11/2006 | Vronay et al. |
| 2006/0271535 | A1 | 11/2006 | Hammond et al. |
| 2006/0277168 | A1 | 12/2006 | Hammond et al. |
| 2007/0132767 | A1 | 6/2007 | Wright et al. |
| 2007/0185846 | A1 | 8/2007 | Budzik et al. |
| 2007/0185847 | A1 | 8/2007 | Budzik et al. |
| 2007/0185861 | A1 | 8/2007 | Budzik et al. |
| 2007/0185862 | A1 | 8/2007 | Budzik et al. |
| 2007/0185863 | A1 | 8/2007 | Budzik et al. |
| 2007/0185864 | A1 | 8/2007 | Budzik et al. |
| 2007/0185865 | A1 | 8/2007 | Budzik et al. |
| 2007/0250479 | A1 | 10/2007 | Lunt et al. |
| 2007/0250826 | A1 | 10/2007 | O'Orien |
| 2008/0250070 | A1 | 10/2008 | Abdulla et al. |
| 2008/0313130 | A1 | 12/2008 | Hammond et al. |
| 2009/0019013 | A1 | 1/2009 | Tareen et al. |
| 2009/0030899 | A1 | 1/2009 | Tareen et al. |
| 2009/0049041 | A1 | 2/2009 | Tareen et al. |
| 2009/0083288 | A1 | 3/2009 | LeDain et al. |
| 2009/0144608 | A1 | 6/2009 | Oisel et al. |
| 2010/0161541 | A1 | 6/2010 | Covannon et al. |
| 2011/0087486 | A1 | 4/2011 | Schiller |
| 2011/0113315 | A1 | 5/2011 | Datha et al. |
| 2011/0246182 | A1 | 10/2011 | Allen |
| 2011/0249953 | A1 | 10/2011 | Suri et al. |
| 2012/0158850 | A1 | 6/2012 | Harrison et al. |
| 2013/0091031 | A1 | 4/2013 | Baran et al. |
| 2013/0144605 | A1* | 6/2013 | Brager .................. G06F 17/28 704/9 |
| 2013/0144606 | A1 | 6/2013 | Birnbaum et al. |
| 2013/0145242 | A1 | 6/2013 | Birnbaum et al. |
| 2013/0174026 | A1 | 7/2013 | Locke |
| 2013/0262092 | A1 | 10/2013 | Wasick |
| 2016/0162445 | A1 | 6/2016 | Birnbaum et al. |
| 2016/0328365 | A1 | 11/2016 | Birnbaum et al. |
| 2017/0060857 | A1 | 3/2017 | Imbruce et al. |
| 2017/0344518 | A1 | 11/2017 | Birnbaum et al. |

OTHER PUBLICATIONS

Dramatica Pro version 4, Write Brothers, 1993-2006, user manual.*
Storyview, Screenplay Systems, 2000, user manual.*
Movie Magic Screenwriter, Writer Brothers, 2009, user manual.*
Allen et al., "StatsMonkey: A Data-Driven Sports Narrative Writer", Computational Models of Narrative: Papers from the AAAI Fall Symposium, Nov. 2010, 2 pages.
Andersen, P., Hayes, P., Huettner, A., Schmandt, L., Nirenburg, I., and Weinstein, S. (1992). Automatic extraction of facts from press releases to generate news stories. In Proceedings of the third conference on Applied natural language processing. (Trento, Italy). ACM Press, New York, NY, 170-177.
Andre, E., Herzog, G., & Rist, T. (1988). On the simultaneous interpretation of real world image sequences and their natural language description: the system SOCCER. Paper presented at Proceedings of the 8th. European Conference on Artificial Intelligence (ECAI), Munich.
Asset Economics, Inc. (Feb. 11, 2011).
Bailey, P. (1999). Searching for Storiness: Story-Generation from a Reader's Perspective. AAAI Technical Report FS-99-01.
Bethem, T., Burton, J., Caldwell, T., Evans, M., Kittredge, R., Lavoie, B., and Werner, J. (2005). Generation of Real-time Narrative Summaries for Real-time Water Levels and Meteorological Observations in PORTS®. In Proceedings of the Fourth Conference on Artificial Intelligence Applications to Environmental Sciences (AMS-2005), San Diego, California.
Bourbeau, L., Carcagno, D., Goldberg, E., Kittredge, R., & Polguere, A. (1990). Bilingual generation of weather forecasts in an operations environment. Paper presented at Proceedings of the 13th International Conference on Computational Linguistics (COLING), Helsinki, Finland, pp. 318-320.
Boyd, S. (1998). TREND: a system for generating intelligent descriptions of time series data. Paper presented at Proceedings of the IEEE international conference on intelligent processing systems (ICIPS-1998).
Dehn, N. (1981). Story generation after TALE-SPIN. In Proceedings of the Seventh International Joint Conference on Artificial Intelligence. (Vancouver, Canada).
Gatt, A., and Portet, F. (2009). Text content and task performance in the evaluation of a Natural Language Generation System. Proceedings of the Conference on Recent Advances in Natural Language Processing (RANLP-09).
Gatt, A., Portet, F., Reiter, E., Hunter, J., Mahamood, S., Moncur, W., and Sripada, S. (2009). From data to text in the Neonatal Intensive Care Unit: Using NLG technology for decision support and information management. AI Communications 22, pp. 153-186.
Glahn, H. (1970). Computer-produced worded forecasts. Bulletin of the American Meteorological Society, 51(12), 1126-1131.
Goldberg, E., Driedger, N., & Kittredge, R. (1994). Using Natural-Language Processing to Produce Weather Forecasts. IEEE Expert, 9 (2), 45.
Hargood, C., Millard, D. and Weal, M. (2009) Exploring the Importance of Themes in Narrative Systems.
Hargood, C., Millard, D. and Weal, M. (2009). Investigating a Thematic Approach to Narrative Generation, 2009.
Hunter, J., Freer, Y., Gatt, A., Logie, R., McIntosh, N., van der Meulen, M., Portet, F., Reiter, E., Sripada, S., and Sykes, C. (2008).

(56) References Cited

OTHER PUBLICATIONS

Summarising Complex ICU Data in Natural Language. AMIA 2008 Annual Symposium Proceedings, pp. 323-327.
Hunter, J., Gatt, A., Portet, F., Reiter, E., and Sripada, S. (2008). Using natural language generation technology to improve information flows in intensive care units. Proceedings of the 5th Conference on Prestigious Applications of Intelligent Systems, PAIS-08.
Kittredge, R., and Lavoie, B. (1998). MeteoCogent: A Knowledge-Based Tool for Generating Weather Forecast Texts. In Proceedings of the American Meteorological Society AI Conference (AMS-98), Phoenix, Arizona.
Kittredge, R., Polguere, A., & Goldberg, E. (1986). Synthesizing weather reports from formatted data. Paper presented at Proceedings of the 11th International Conference on Computational Linguistics, Bonn, Germany, pp. 563-565.
Kukich, K. (1983). Design of a Knowledge-Based Report Generator. Proceedings of the 21st Conference of the Association for Computational Linguistics, Cambridge, MA, pp. 145-150.
Kukich, K. (1983). Knowledge-Based Report Generation: A Technique for Automatically Generating Natural Language Reports from Databases. Paper presented at Proceedings of the Sixth International ACM SIGIR Conference, Washington, DC.
McKeown, K., Kukich, K., & Shaw, J. (1994). Practical issues in automatic documentation generation. 4th Conference on Applied Natural Language Processing, Stuttgart, Germany, pp. 7-14.
Meehan, James R., TALE-SPIN. (1977). An Interactive Program that Writes Stories. In Proceedings of the Fifth International Joint Conference on Artificial Intelligence.
Moncur, W., and Reiter, E. (2007). How Much to Tell? Disseminating Affective Information across a Social Network. Proceedings of Second International Workshop on Personalisation for e-Health.
Moncur, W., Masthoff, J., Reiter, E. (2008) What Do You Want to Know? Investigating the Information Requirements of Patient Supporters. 21st IEEE International Symposium on Computer-Based Medical Systems (CBMS 2008), pp. 443-448.
Portet, F., Reiter, E., Gatt, A., Hunter, J., Sripada, S., Freer, Y., and Sykes, C. (2009). Automatic Generation of Textual Summaries from Neonatal Intensive Care Data. Artificial Intelligence.
Portet, F., Reiter, E., Hunter, J., and Sripada, S. (2007). Automatic Generation of Textual Summaries from Neonatal Intensive Care Data. In: Bellazzi, Riccardo, Ameen Abu-Hanna and Jim Hunter (Ed.), 11th Conference on Artificial Intelligence in Medicine (AIME 07), pp. 227-236.
Prosecution History for U.S. Appl. No. 13/186,308, now USPN 8,775,161, filed Jul. 19, 2011.
Prosecution History for U.S. Appl. No. 13/186,329, now U.S. Pat. No. 8,892,417, filed Jul. 19, 2011.
Prosecution History for U.S. Appl. No. 13/186,337, now U.S. Pat. No. 8,886,520, filed Jul. 19, 2011.
Prosecution History for U.S. Appl. No. 13/186,346, filed Jul. 19, 2011.
Prosecution History for U.S. Appl. No. 13/464,635, filed May 4, 2012.
Prosecution History for U.S. Appl. No. 13/464,675 filed May 4, 2012.

Reiter et al., "Building Applied Natural Generation Systems", Cambridge University Press, 1995, pp. 1-32.
Reiter, E. (2007). An architecture for Data-To-Text systems. In: Busemann, Stephan (Ed.), Proceedings of the 11th European Workshop on Natural Language Generation, pp. 97-104.
Reiter, E., Gatt, A., Portet, F., and van der Meulen, M. (2008). The importance of narrative and other lessons from an evaluation of an NLG system that summarises clinical data. Proceedings of the 5th International Conference on Natural Language Generation.
Reiter, E., Sripada, S., Hunter, J., Yu, J., and Davy, I. (2005). Choosing words in computer-generated weather forecasts. Artificial Intelligence, 167:137-169.
Riedl et al., "Narrative Planning: Balancing Plot and Character", Journal of Artificial Intelligence Research, 2010, pp. 217-268, vol. 39.
Robin, J. (1996). Evaluating the portability of revision rules for incremental summary generation. Paper presented at Proceedings of the 34th. Annual Meeting of the Association for Computational Linguistics (ACL'96), Santa Cruz, CA.
Rui, Y., Gupta, A., and Acero, A. 2000. Automatically extracting highlights for TV Baseball programs. In Proceedings of the eighth ACM international conference on Multimedia. (Marina del Rey, California, United States). ACM Press, New York, NY 105-115.
Sripada, S., Reiter, E., and Davy, I. (2003). SumTime-Mousam: Configurable Marine Weather Forecast Generator. Expert Update 6(3):4-10.
Theune, M., Klabbers, E., Odijk, J., dePijper, J., and Krahmer, E. (2001) "From Data to Speech: A General Approach", Natural Language Engineering 7(1): 47-86.
Thomas, K., and Sripada, S. (2007). Atlas.txt: Linking Georeferenced Data to Text for NLG. Paper presented at Proceedings of the 2007 European Natural Language Generation Workshop (ENLGO7).
Thomas, K, and Sripada, S. (2008). What's in a message? Interpreting Geo-referenced Data for the Visually-impaired. Proceedings of the Int. conference on NLG.
Thomas, K, Sumegi, L., Ferres, L., and Sripada, S. (2008). Enabling Access to Geo-referenced Information: Atlas.txt. Proceedings of the Cross-disciplinary Conference on Web Accessibility.
van der Meulen, M., Logie, R., Freer, Y., Sykes, C., McIntosh, N., and Hunter, J. (2008). When a Graph is Poorer than 100 Words: A Comparison of Computerised Natural Language Generation, Human Generated Descriptions and Graphical Displays in Neonatal Intensive Care. Applied Cognitive Psychology.
Yu, J., Reiter, E., Hunter, J., and Mellish, C. (2007). Choosing the content of textual summaries of large time-series data sets. Natural Language Engineering, 13:25-49.
Yu, J., Reiter, E., Hunter, J., and Sripada, S. (2003). SUMTIME-TURBINE: A Knowledge-Based System to Communicate Time Series Data in the Gas Turbine Domain. In P Chung et al. (Eds) Developments in Applied Artificial Intelligence: Proceedings of IEA/AIE-2003, pp. 379-384. Springer (LNAI 2718).
Memorandum Opinion and Order for *O2 Media, LLC* v. *Narrative Science Inc., Case* 1:15-cv-05129 (N. D. IL), Feb. 25, 2016, 25 pages. (invalidating claims of U.S. Pat. Nos. 7,856,390, 8,494,944, and 8,676,691 owned by O2 Media, LLC.

\* cited by examiner

| | | | | |
|---|---|---|---|---|
| MultipleMarriages | false | 0.2 | ● | |
| MultipleMarriagesNoChildren | false | 100.3 | | |
| MultipleMarriagesWithChildren | false | 105.3 | | |
| Religion | true | 0.1 | ● | |
| Excommunication | false | 90.2 | | |
| Residence | true | 0.1 | ● | |
| BaselineResidence | true | 73.2 | | |
| LongResidence | true | 0.2 | ● | |
| LongResidenceCity | false | 76.2 | | |
| LongResidenceCounty | false | 75.6 | | |
| LongResidenceState | false | 75.6 | | |
| Migration | true | 0.2 | ● | |
| LivedInMultipleCountries | false | 90.3 | | |
| MoreThanTwoMoves | false | 0 | | |
| MoreThanTwoMovesSameCity | false | 0 | | |
| MoreThanTwoMovesSameCo... | false | 0 | | |
| MoreThanTwoMovesSameState | false | 0 | | |
| MoveInOffState | false | 76.3 | | |
| MoveToUS | false | 88.3 | | |
| MultipleMoves | false | 77.3 | | |
| MultipleMovesToDiffState | false | 76.3 | | |
| OneMove | false | 0 | | |
| OneMoveSameCity | false | 0 | | |
| OneMoveSameCounty | false | 0 | | |
| OneMoveSameState | false | 0 | | |
| TwoMoves | false | 0 | | |
| TwoMovesSameCity | false | 0 | | |
| TwoMovesSameCounty | false | 0 | | |
| TwoMovesSameState | false | 0 | | |
| TwoMovesToOffState | false | 77.3 | | |
| Household | false | 0.2 | ● | |
| BaselineHousehold | false | 74.3 | | |
| SingleFamily | false | 0 | | |

| | | | |
|---|---|---|---|
| MarriedTwiceChildrenSecondMarriage | false | 95.3 | |
| MarriedTwiceNoChildren | false | 93.3 | |
| MarriedTwiceChildrenFirstMarriage | false | 94.3 | |
| MarriedTwiceChildrenBothMarriages | false | 96.3 | |
| Excommunication | false | 30.3 | |

© Narrative Science 2013

METHOD AND SYSTEM FOR CONFIGURING AUTOMATIC GENERATION OF NARRATIVES FROM DATA

CROSS-REFERENCE AND PRIORITY CLAIM TO RELATED APPLICATION

This patent application claims priority to U.S. provisional patent application Ser. No. 61/799,328, filed Mar. 15, 2013, entitled "Method and System for Configuring Automatic Generation of Narratives from Data", the entire disclosure of which is incorporated herein by reference.

INTRODUCTION

A method or system for automatically generating narratives from data must be configured appropriately in order to, on the one hand, generate narratives relevant to the needs of a particular audience, and, on the other, to ingest, organize, and process the available data for this purpose. We have previously developed methods and systems for automatically generating narratives from data; and we have also developed methods and systems for devising and implementing configurable platforms capable of carrying out and implementing such methods and systems in order to generate relevant narratives based on appropriate data as described above.

Here, we describe a method and system for configuring such a platform. The configuration process itself is carried out, primarily, by people skilled in the development of editorial content, as opposed to technology developers. A method or system aimed at supporting this process must comprise several elements: First, a delineation of the information that must be provided by these users, comprising the necessary configuration, about the available data, derivations describing and implementing important analyses based on that data, appropriate conclusions and interpretations based on those data and analyses, relevant narrative forms, and appropriate words and phrases for conveying selected data, derivations, and interpretations in linguistic sequences and structures to readers, in order to generate appropriate narratives. Second, an interface and interaction model aimed at eliciting and describing this configuration information, comprising methods and systems for supporting users in determining and notating the necessary information. And third, a method and system for enabling users to quickly and effectively determine whether the configurations they have specified are leading to the desired outcomes with regard to the generation of appropriate narratives and/or utilization of the available data, and if not, why, in order to effectively and efficiently iterate on and improve these configurations.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 1 illustrates an interface showing high-level Outlines that have been specified in the current configuration according to an exemplary embodiment;

FIG. 2 illustrates a specific story Outline that has been selected for inspection or further development, and its constituent Content Blocks according to an exemplary embodiment;

FIG. 16 illustrates a Blueprint Set including a series of alternative ways of expressing the facts relevant to a given Angle in a given Content Block according to an exemplary embodiment;

FIG. 21 illustrates the initial screen seen by a user upon returning to work on a configuration in progress according to an exemplary embodiment;

FIG. 22 illustrates a configuration tool loaded with a number of different sets of sample data according to an exemplary embodiment;

DETAILED DESCRIPTION

1. Information Comprising the Necessary Configuration

Figure 3:
FIG. 3 illustrates an Outline in an "expanded" view, in which all of its constituent Content Blocks, associated Angles, etc., may be inspected or selected for further development according to an exemplary embodiment.

In the configurable platform for generating narratives from data that we have developed, the configuration information that must be supplied in order to generate appropriate narratives from relevant information is as follows; these elements and their function are described more extensively in previous patents and disclosures (see U.S. Pat. Nos. 8,374,848, 8,355,903, and 8,630,844, and U.S. patent application Ser. Nos. 13/464,635, 13/464,675, 13/186,308, 13/186,329, 13/186,337, and 13/186,346, the entire disclosures of each of which are incorporated herein by reference):

i. Models: These comprise appropriate structures for organizing and accessing the data about specific entities and events in generating relevant narratives.
  ii. Derivations: These comprise relevant aggregations and other functions the values of which are determined by the data organized by and contained in the Models.
  iii. Angles and Angle Families: Angles comprise larger thematic structures that aggregate, connect, and characterize data in understandable and useful terms. Angle Families are sets of related Angles that share common conditions and attributes.
  iv. Content Blocks: These comprise the rhetorical structures associated with a given story type and include:
    a. Content Nodes: Sequence of related Content Blocks, comprising the hierarchical description of a narrative.
    b. Outlines: Types of Content Nodes representing the high-level structure of a story.
    c. Basic Content Blocks: Structures specifying the relevant entities (Model components), Angles/Angle Families (interpretations), and linguistic forms (in the form of Blueprint Sets, Blueprints, and Phraseblocks), which constitute portions of a narrative.
    d. Blueprint Sets, Blueprints, and Phraseblocks: The structures representing actual words and phrases used to convey information relating to particular angles or derived features in the context of particular content blocks.

2. Interfaces for Interaction in Support of Configuration

To support users in specifying the necessary information described above in configuring a mechanism such as the ones described in the above-referenced and incorporated patents and patent applications for generating stories from data in order to create stories of a desired form from specified types of available data, we have developed a graphical user interface tool that elicits this configuration information from users in a well-structured manner, as well as supporting them in supplying this information. The rest of this section is devoted to depicting and describing screens that implement important aspects of this interface and process. It should be understood that varied and distinct designs capable of supporting users in supplying the necessary configuration information in functionally equivalent ways could be developed and implemented.

This interface tool and associated interaction model do not constrain users (editorial experts) to supplying the necessary configuration information in a fixed order. Rather, users can navigate from one screen to another, supplying this information in whatever sequence makes sense to them. Many users will utilize the interface in a "top down" manner, starting by specifying the high-level Outline and its constituent Content Nodes and Content Blocks, then proceeding to Angles and Angle Families, Derivations, Blueprint Sets, etc. Others will proceed in a more "bottom up" fashion, starting from Models, and then specifying Derivations, Angles and Angle Families, and various Content Blocks, before finally composing these into a unified Outline.

As users develop and refine the necessary configurations using this interface, the information they provide is stored in a database. The interface lets users see which portions of the necessary configuration have been completed, and which remain to be developed; and allows them to test portions of the configuration under development in order to assess its suitability and correctness. When the user is satisfied with the configuration information, it is transferred to the configurable platform, which then generates narratives at scale (i.e., potentially large numbers of narratives, each based on different input data) as specified by the configuration.

In most of the following examples, the configurations being depicted as under development are aimed at describing biographical information associated with an individual. It should be clear that different narratives with different aims, and utilizing different kinds of data, would entail the development of different configurations using this interface and interaction model, and that the specifics provided here are for illustrative purposes only.

Figure 1:
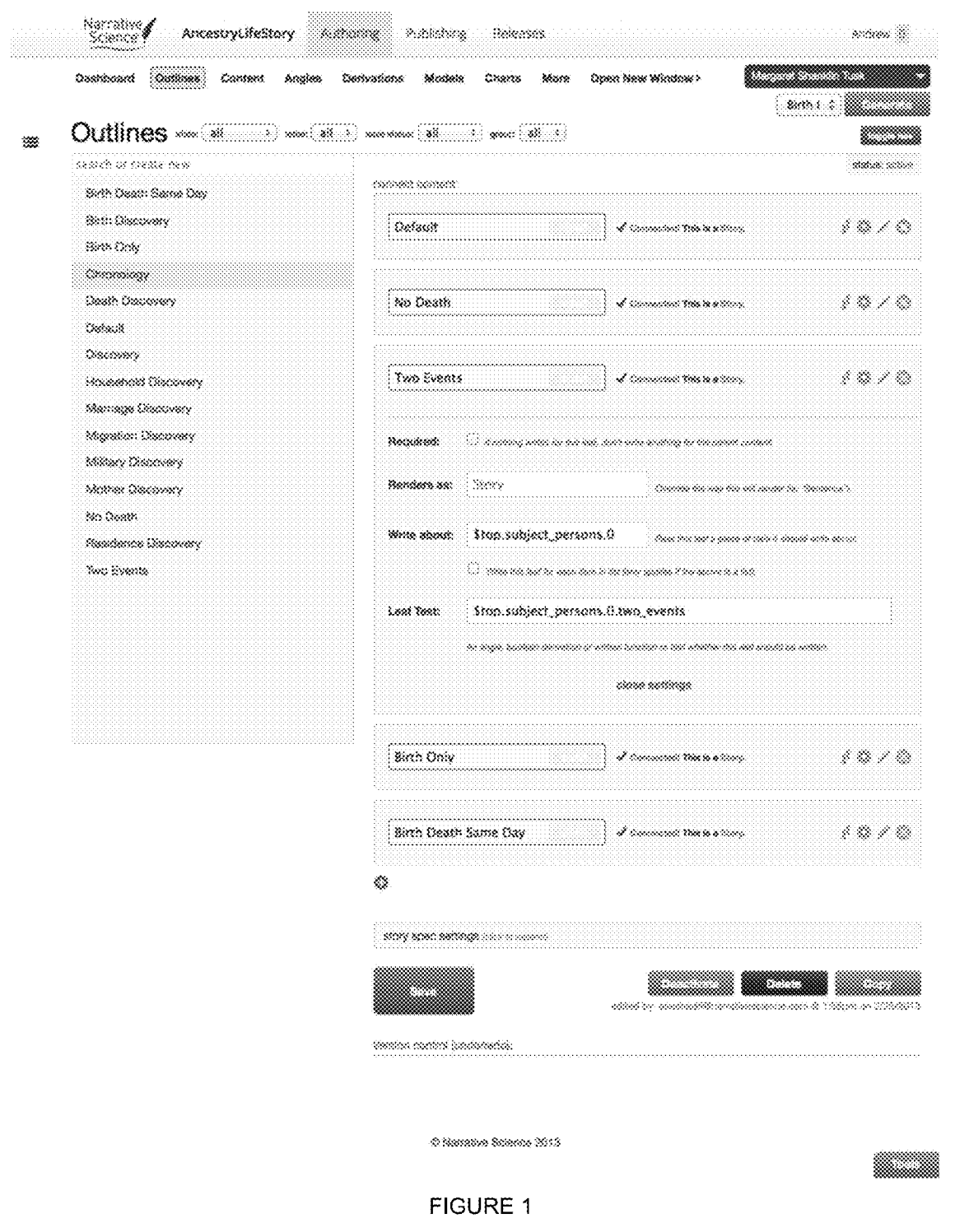

FIG. 1 depicts the interface showing the high-level Outlines that have been specified so far in the current configuration. The Outline to be inspected and/or worked on can be selected from that navigation list provided on the left side. The Outline that has been selected ("Chronology") is disjunctive, and comprises other Outlines that specify different narratives to be generated based on the nature of the data at hand. These constituent Outlines can be expanded to show further detail of their configurations, as depicted here with the Outline "Two Events". This Outline has a focus—the entity that it is "about"—as provided in the "Write about" field, which has been configured to refer to an element of the Model that organizes and provides access to the data from which the narrative will be generated. The Outline also specifies a test, which is a Boolean value supplied by a Derivation, that is used to determine whether the Outline is applicable to the data at hand.

This figure also depicts some general attributes of the interface and interaction model. The navigation bar at the very top shows that the system is currently in "Authoring" (as opposed to "Publishing") mode, since the configuration is still under development. The navigation bar just below that shows the different kinds of information that must be supplied in a configuration as described earlier, e.g., Outlines, Content Blocks, Angles, etc., which enable the user (editorial expert) to select which aspect of the configuration to inspect and/or refine.

Figure 2:
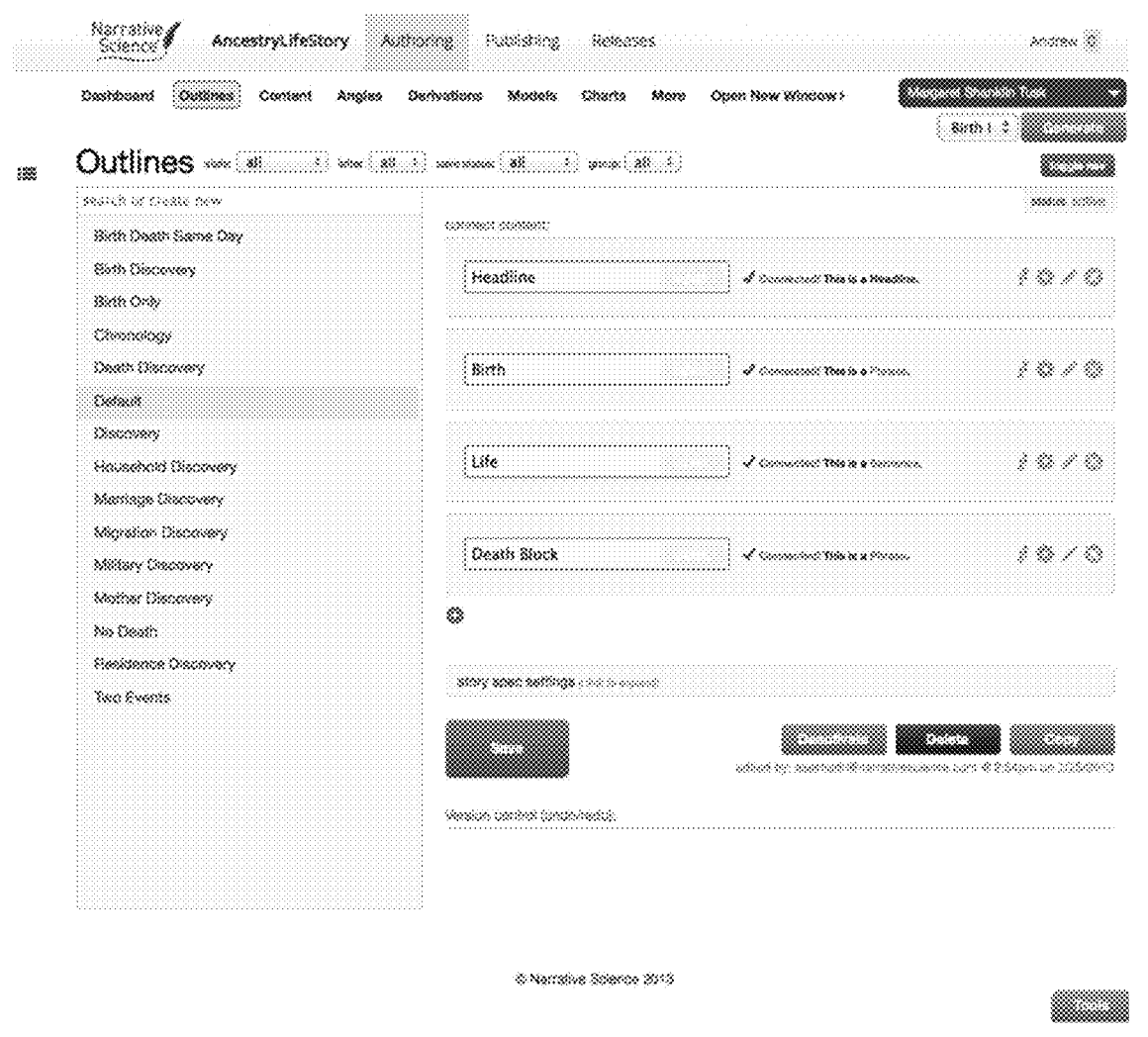

FIG. 2 depicts a specific story Outline ("Default") that has been selected for inspection and/or further development, and its constituent Content Blocks. These Content Blocks in turn may be selected and edited, or new Content Blocks may be added to this Outline.

Figure 3:
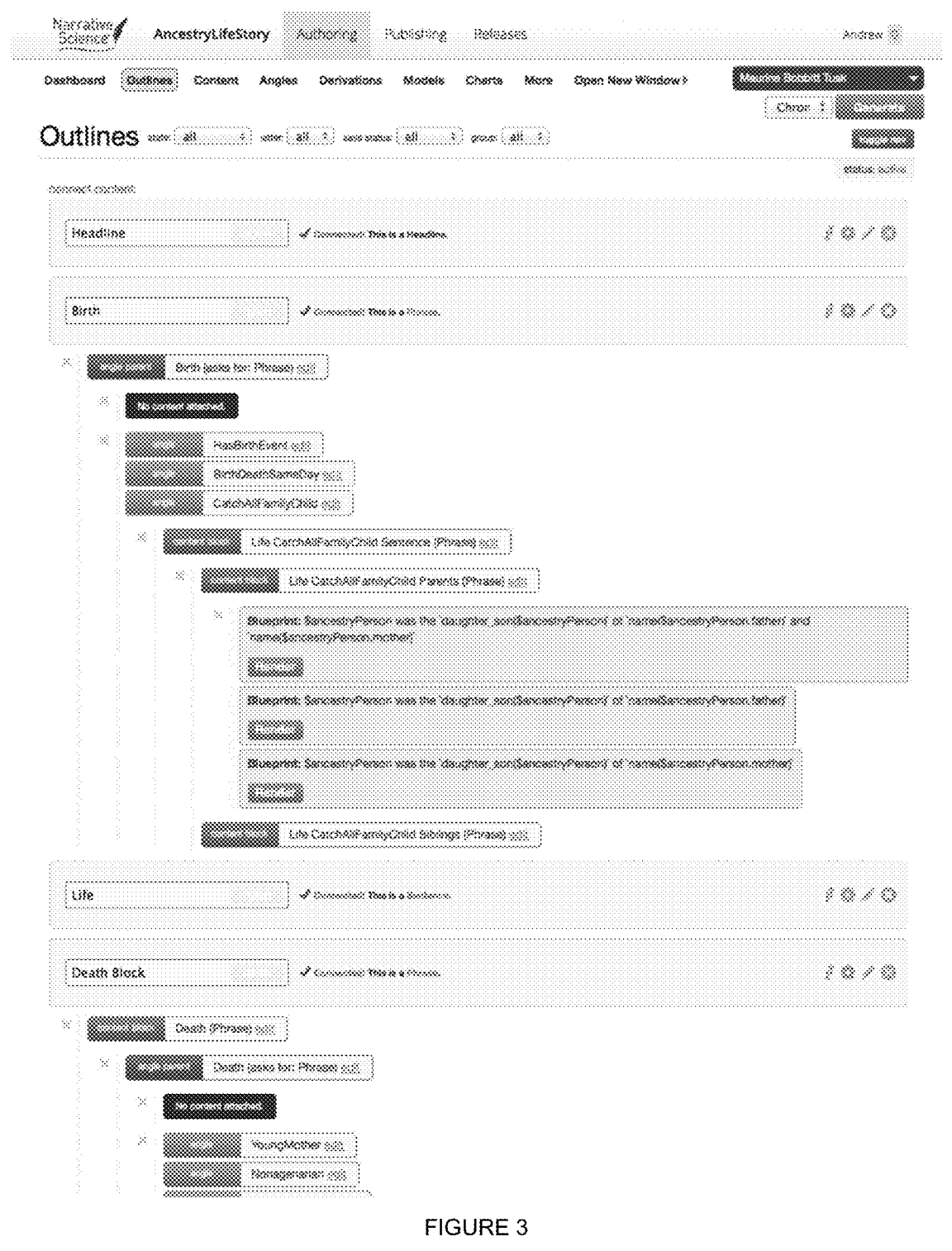

FIG. 3 depicts this same Outline in an "expanded" view, in which all of its constituent Content Blocks, associated Angles, etc., may be inspected and/or selected for further development in relation to the Outline as a whole. The indentation structure of this view reflects the hierarchical structure of the Outline.

Figure 4:
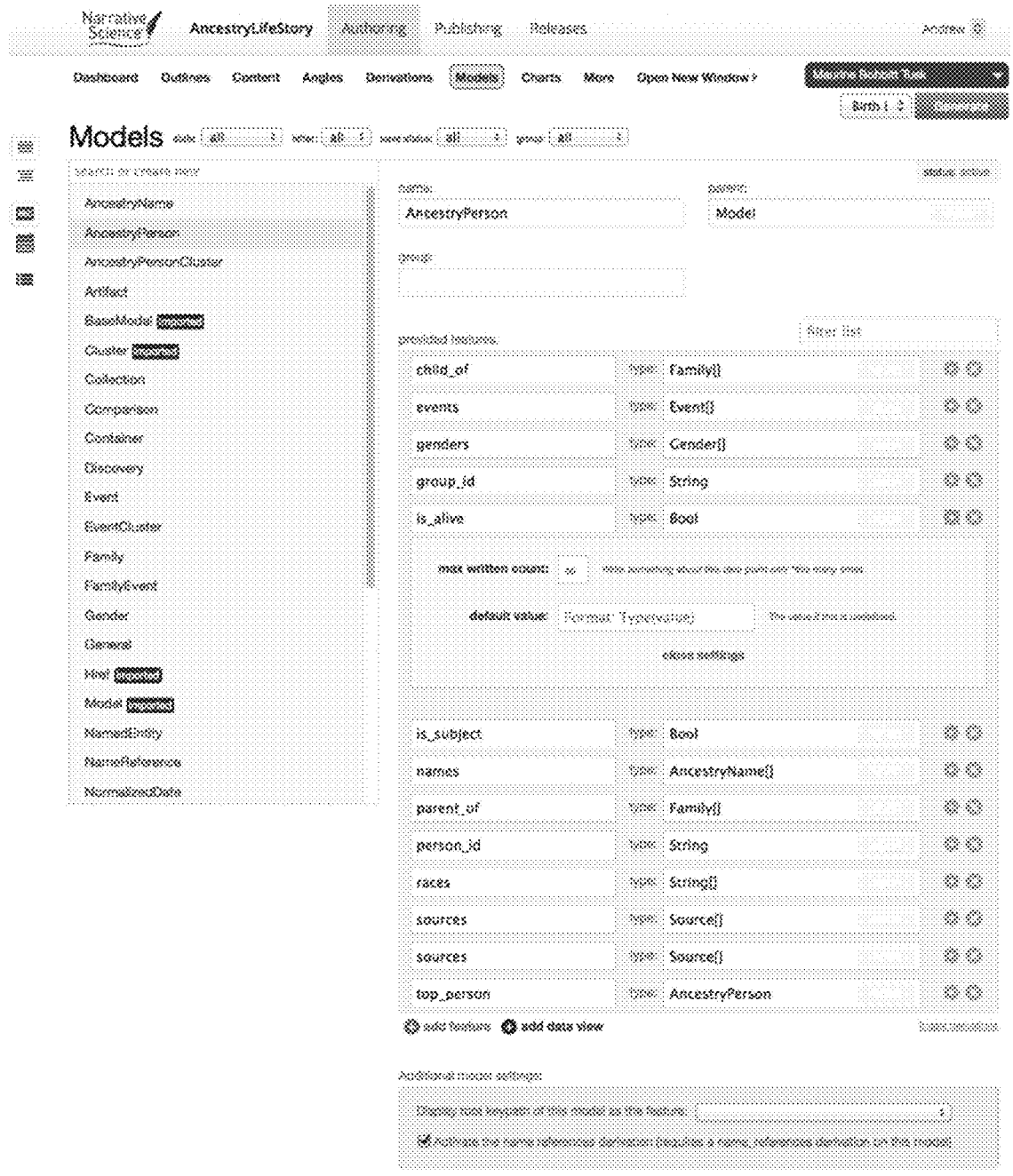
FIG. 4 illustrates types of Models available for utilization in configuring and ultimately generating a story according to an exemplary embodiment.
Figure 4:
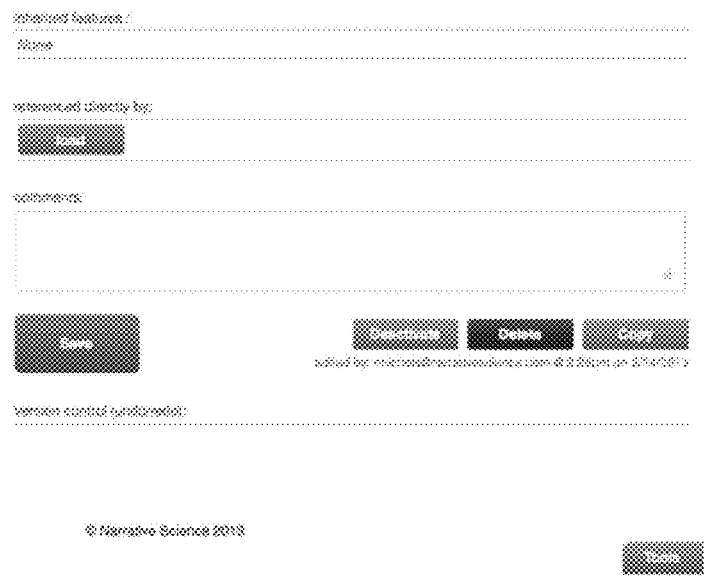

FIG. 4 depicts the types of Models (structured data elements) available for utilization in configuring and ultimately generating a story. The user may also create new Model types, with specified components as needed or convenient to further refine the configuration under development. In actual story generation, these Models must be supplied with actual data corresponding to their components, in a mapping and data transfer process that lies outside the scope of this invention.

Figure 5:
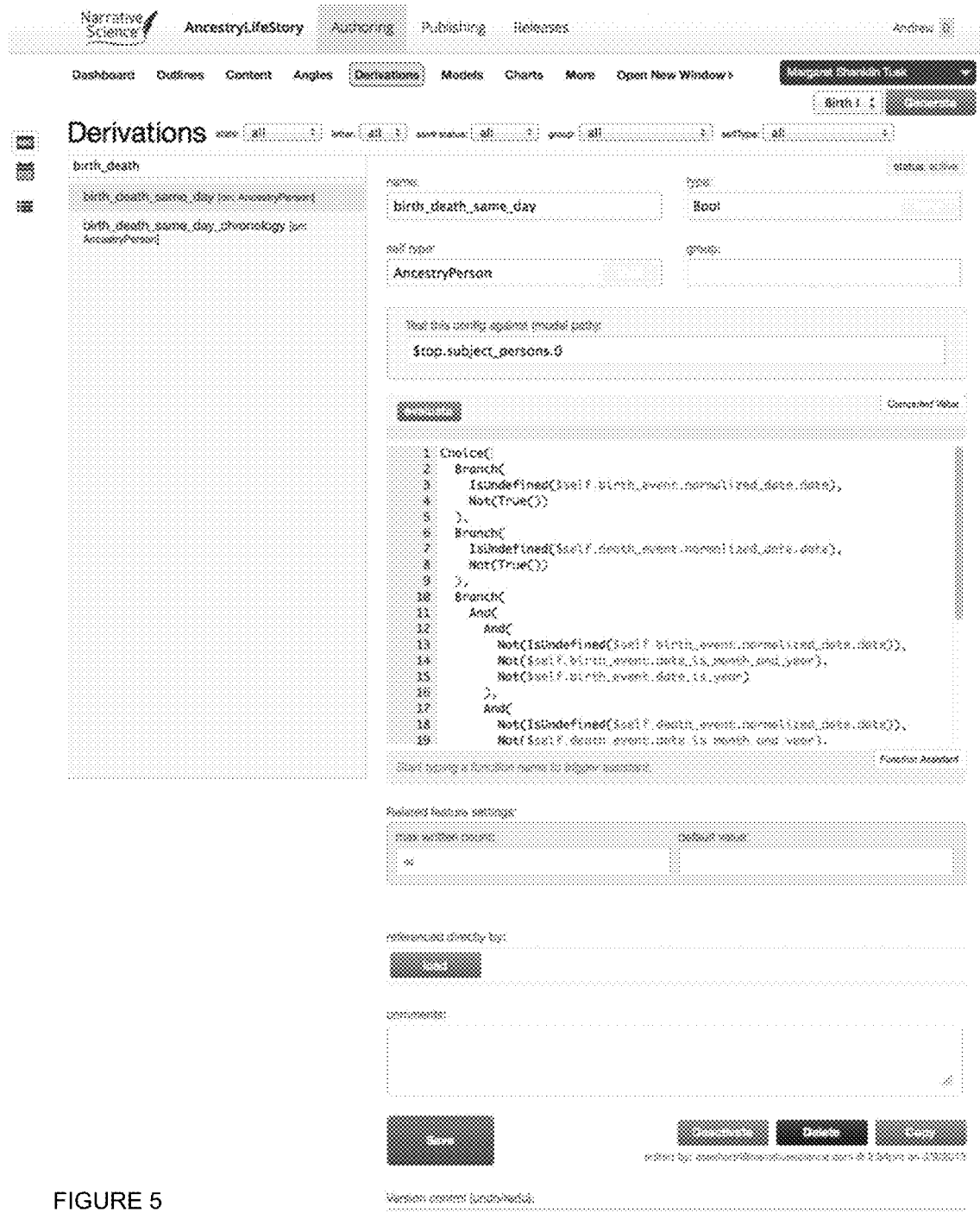
FIG. 5 illustrates a Derivation having been selected for inspection or refinement according to an exemplary embodiment.
Figure 5:

FIG. 5 depicts a Derivation having been selected for inspection and/or refinement. During configuration, the Derivation is given a name, a type of result (in this case Boolean), the types of data to which it is applied, the components of the Model to which it is applied, and then finally a description of how it is to be computed in terms of a special-purpose specification language.

Figure 6:
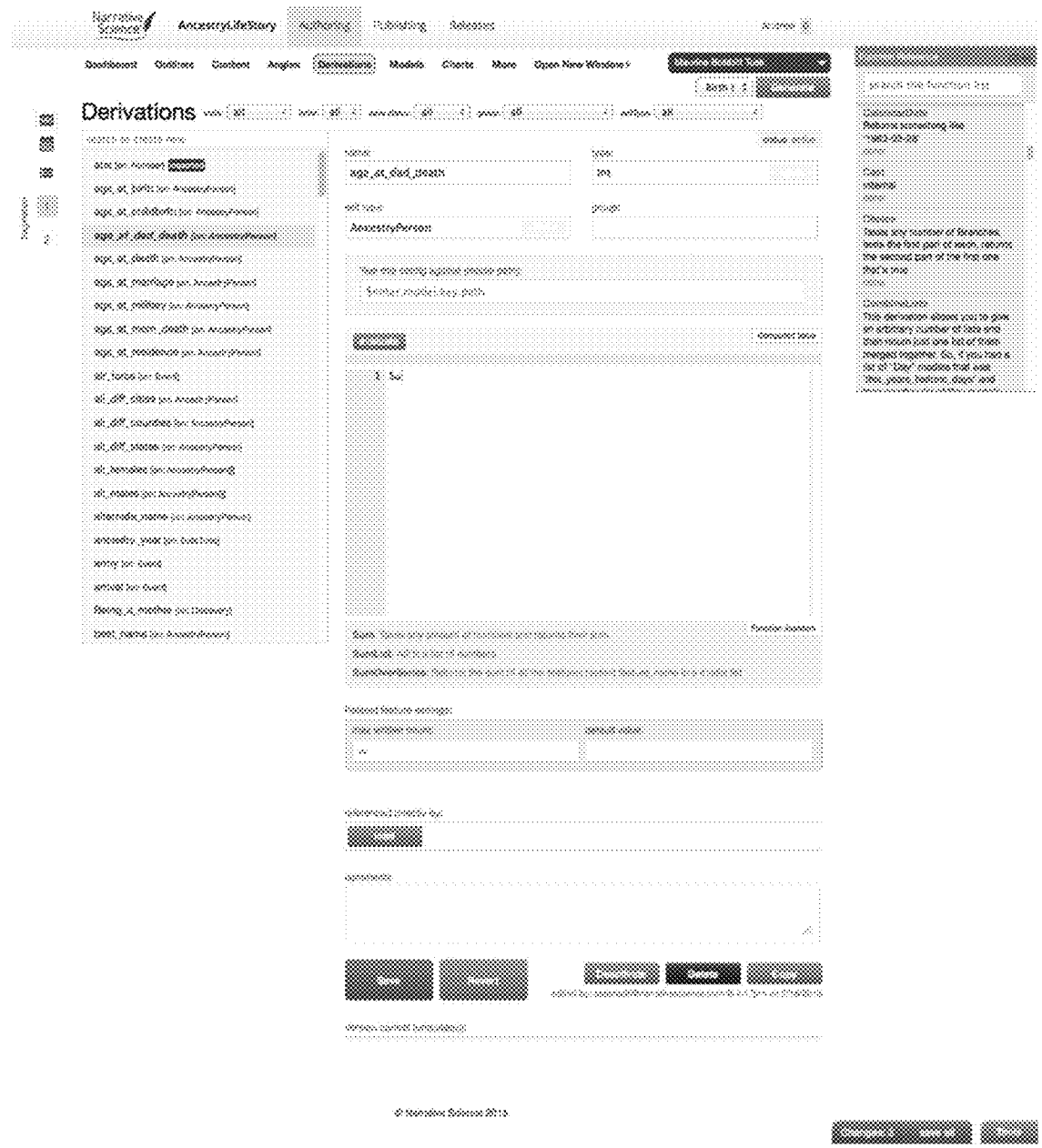
FIG. 6 illustrates operations provided by a specification language available to the user through a searchable reference tool according to an exemplary embodiment.
Figure 7:
FIG. 7 illustrates the interface supplying suggestions about specific entities in the current configuration to which a user might be referring as he or she enters the names of specific entities according to an exemplary embodiment.
Figure 7:
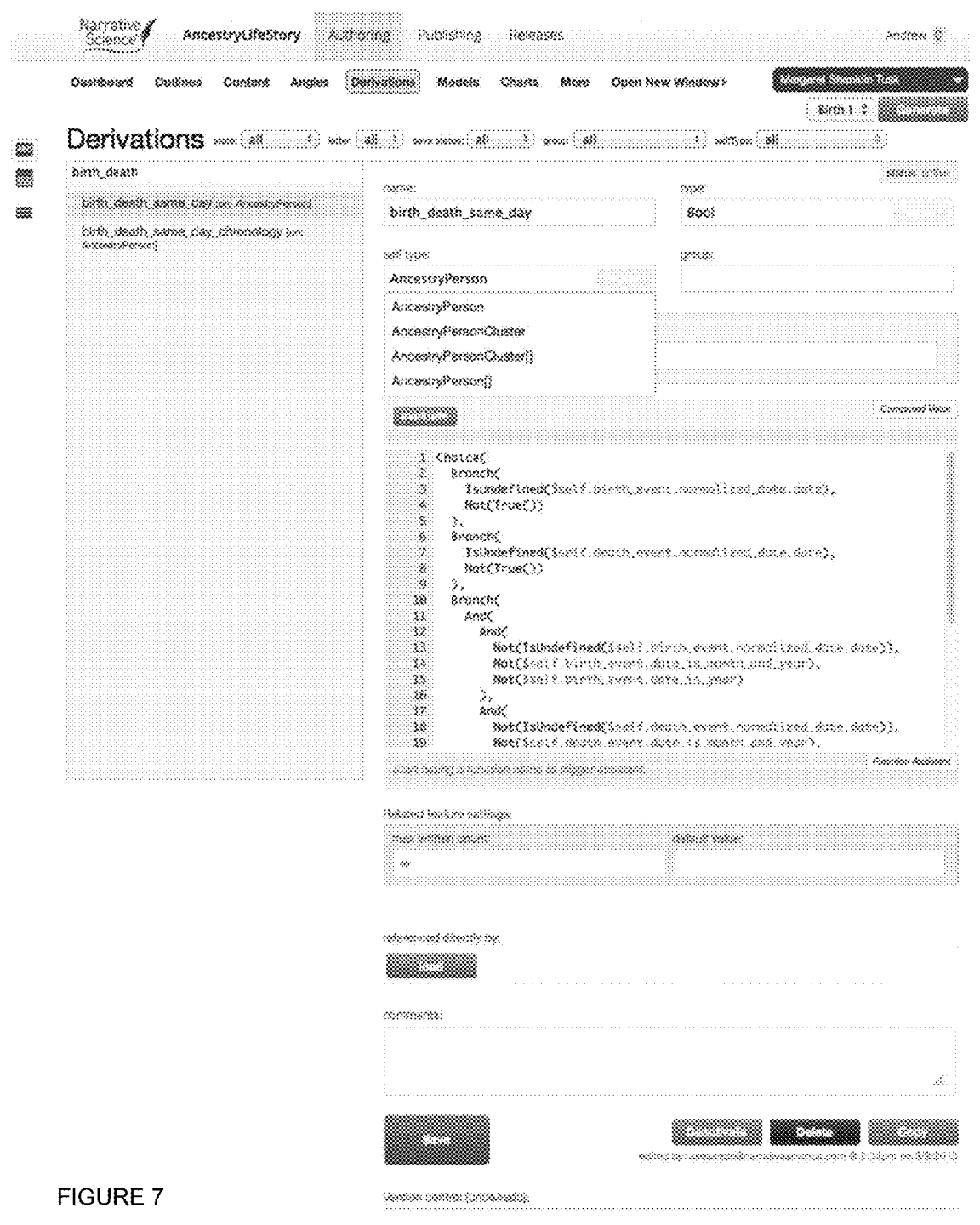
Figure 8:
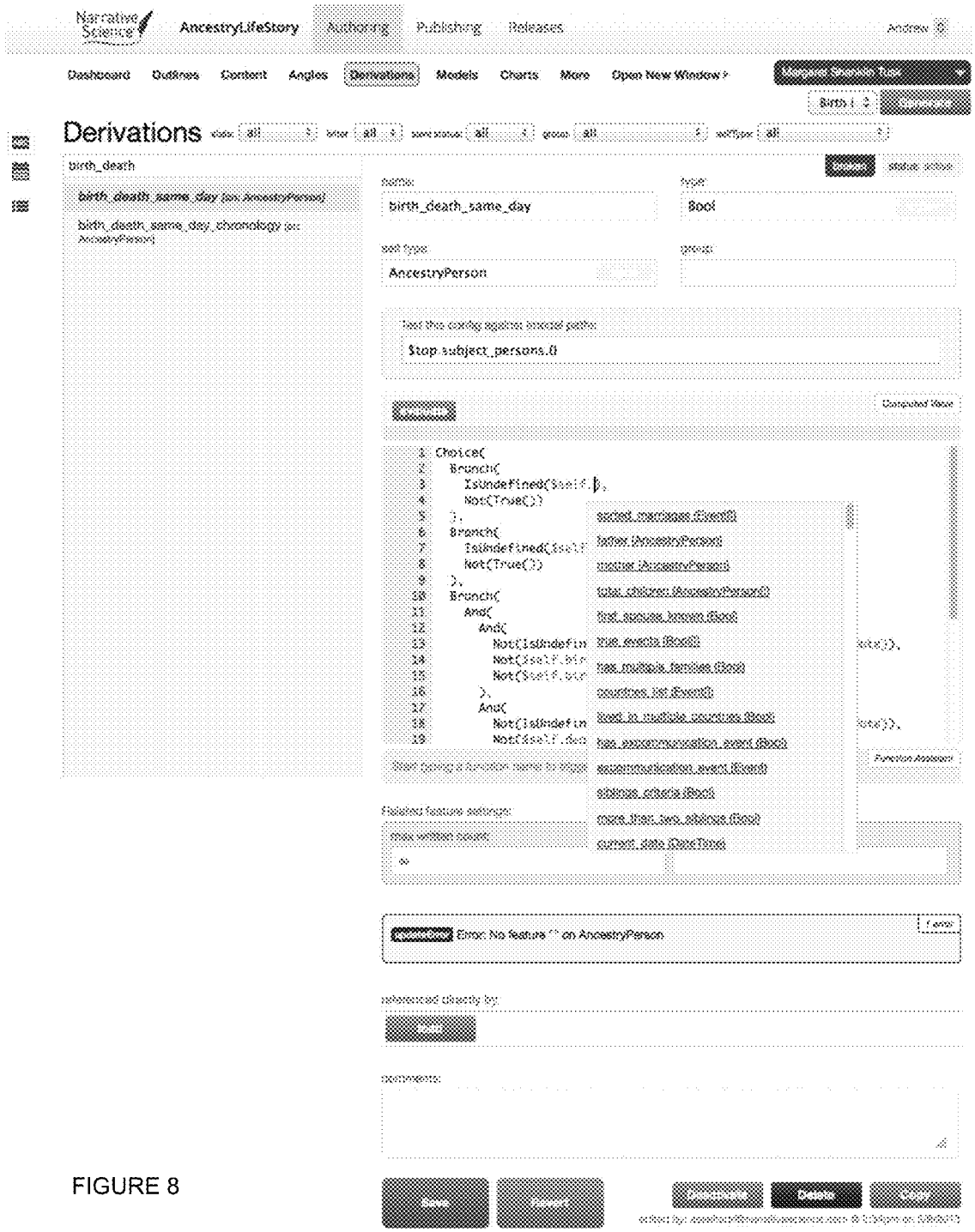
FIG. 8 illustrates an error message displayed when the user supplies a name that doesn't refer to an existing entity in the configuration according to an exemplary embodiment.
Figure 8:

FIGS. 6 through 8 illustrate the kinds of help available to users as they utilize the interface to develop an appropriate configuration. As depicted in FIG. 6, the operations provided by this specification language are available to the user through a searchable reference tool. Additionally, as a user enters operation names, the available operations to which he or she might be referring are also suggested on the basis of what has been entered so far.

As depicted in FIG. 7, the interface also supplies suggestions about the specific entities (e.g., Model components, Derivations, Angles, etc.) in the current configuration to which a user might be referring as he or she enters the names of these specific entities. As depicted in FIG. 8, when the user supplies a name that doesn't refer to an existing entity in the configuration, an error message is immediately displayed.

Figure 9:
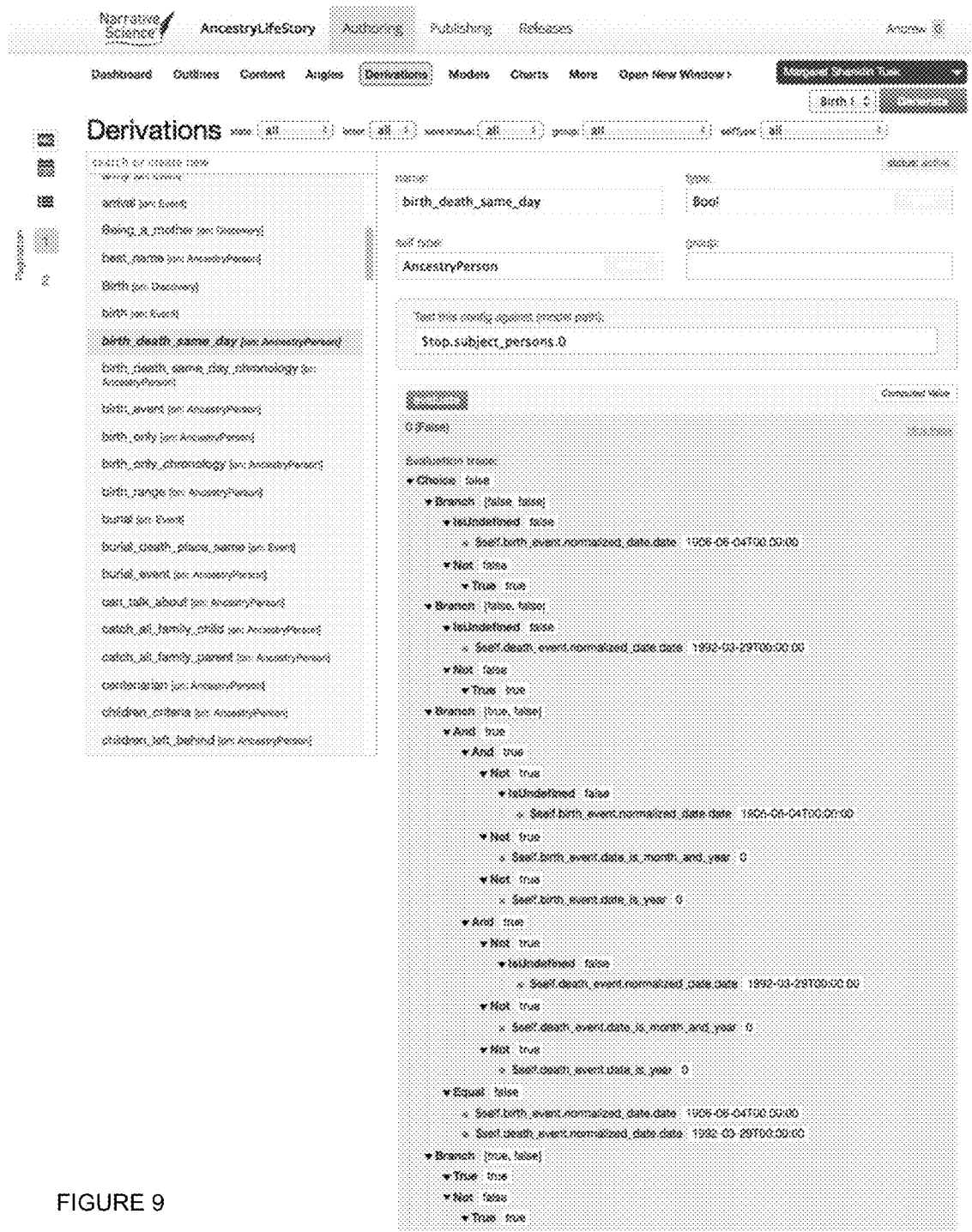
FIG. 9 illustrates the result of an evaluation according to an exemplary embodiment.

As a user is developing the configuration of a Derivation, he or she may test it using the "Evaluate" button displayed. As depicted in FIG. 9, the result of this evaluation is provided along with a trace of how each part of the Derivation's specification performed. (This capacity to provide immediate feedback on the operation of partial or complete configurations is a critical aspect of the system and method for configuration described here, and will be further elaborated below.)

Figure 10:
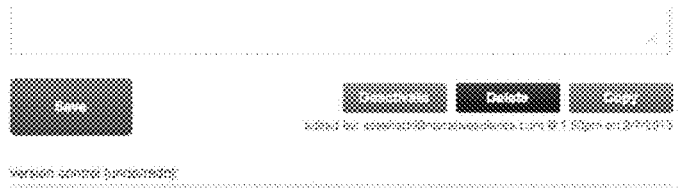
FIG. 10 illustrates the system presenting Angles to the user according to an exemplary embodiment.
Figure 10:

FIG. 10 illustrates how the system presents Angles to the user. The current set of Angles under development is presented and available for navigation on the left. This screen shows a parent Angle (which spans an Angle family). The system prompts users to enter the applicability conditions and interestingness/importance of the Angle, and automatically displays the other configuration elements that refer to the Angle.

Figure 11:
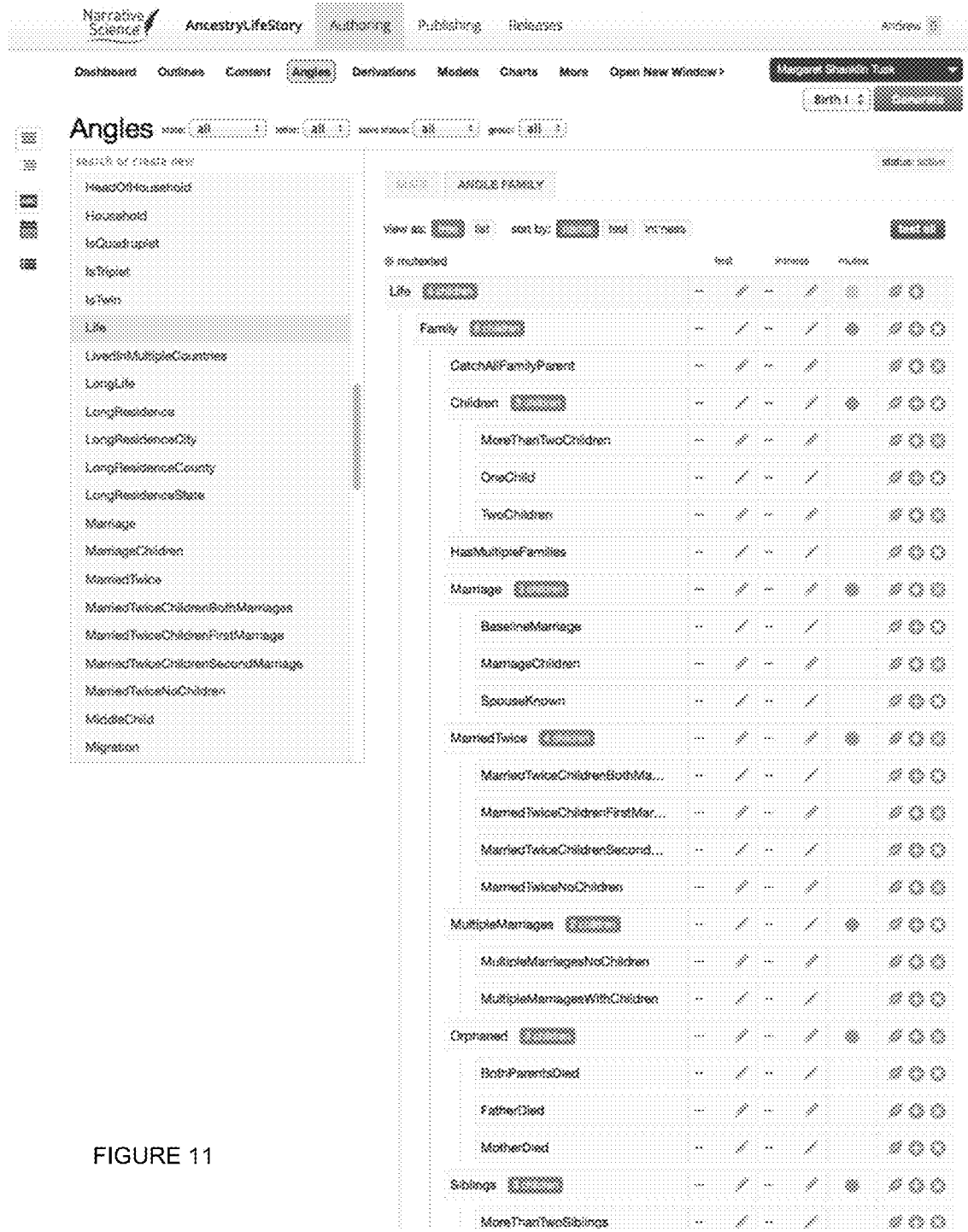
FIG. 11 illustrates the parent Angle of FIG. 10 fully expanded to display all the Angles it comprises according to an exemplary embodiment.
Figure 11:
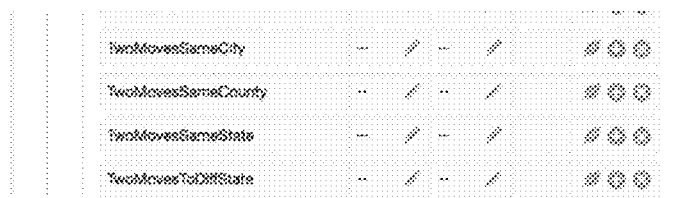
Figure 11:

FIG. 11 shows the parent Angle of FIG. 10 fully expanded to display all the Angles it comprises. The indentation structure displayed by the interface reflects the hierarchical structure of the Angle family in terms of shared (or, alternatively, disjoint) conditions of applicability. The conditions of applicability are expressed in terms of data accessed through the Model or of derived features.

Figure 12:
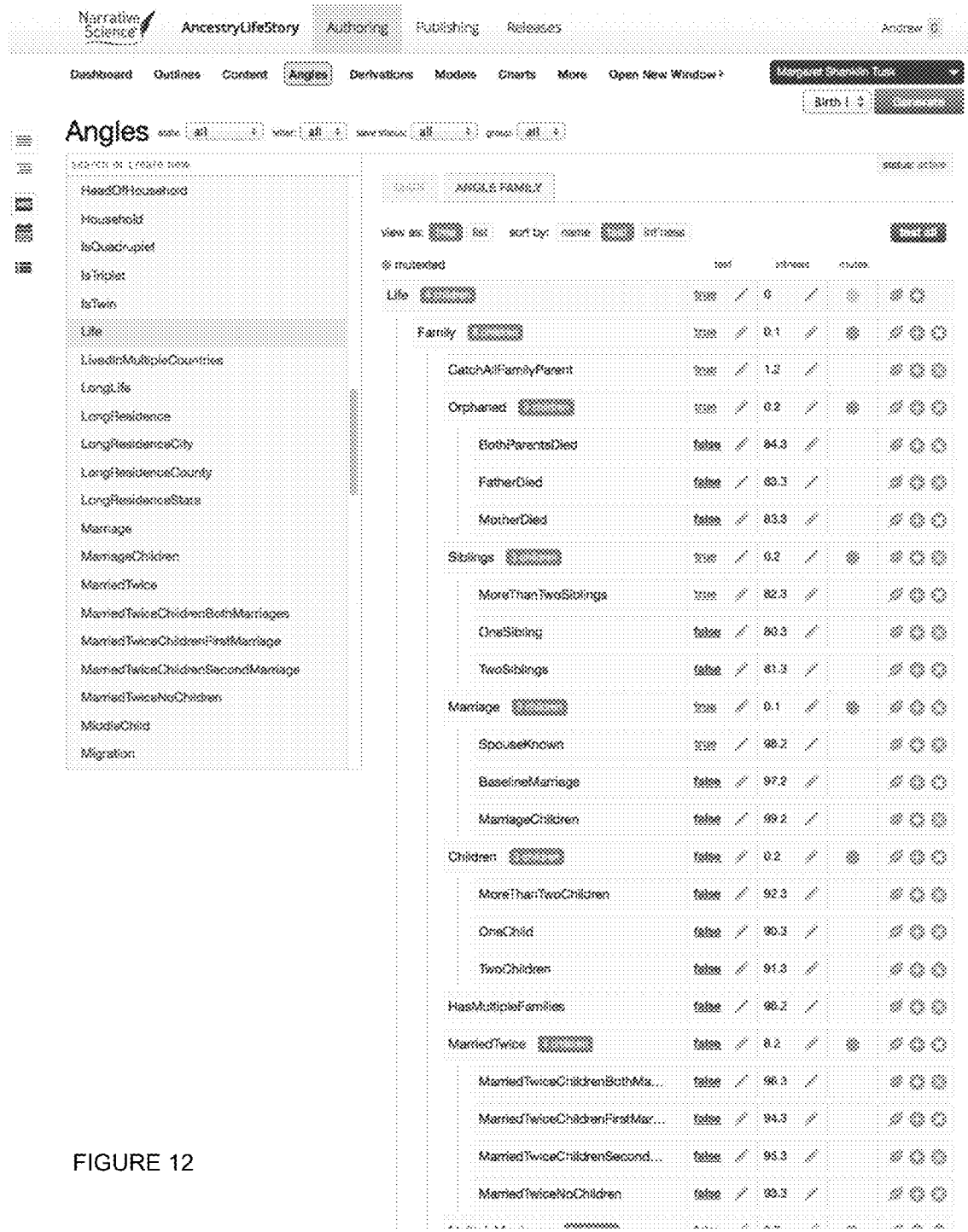
FIG. 12 illustrates the same list as FIG. 11, after the conditions of applicability have been tested on data determined by the user, which aids in finding errors in these conditions according to an exemplary embodiment.
Figure 12:
Figure 13:
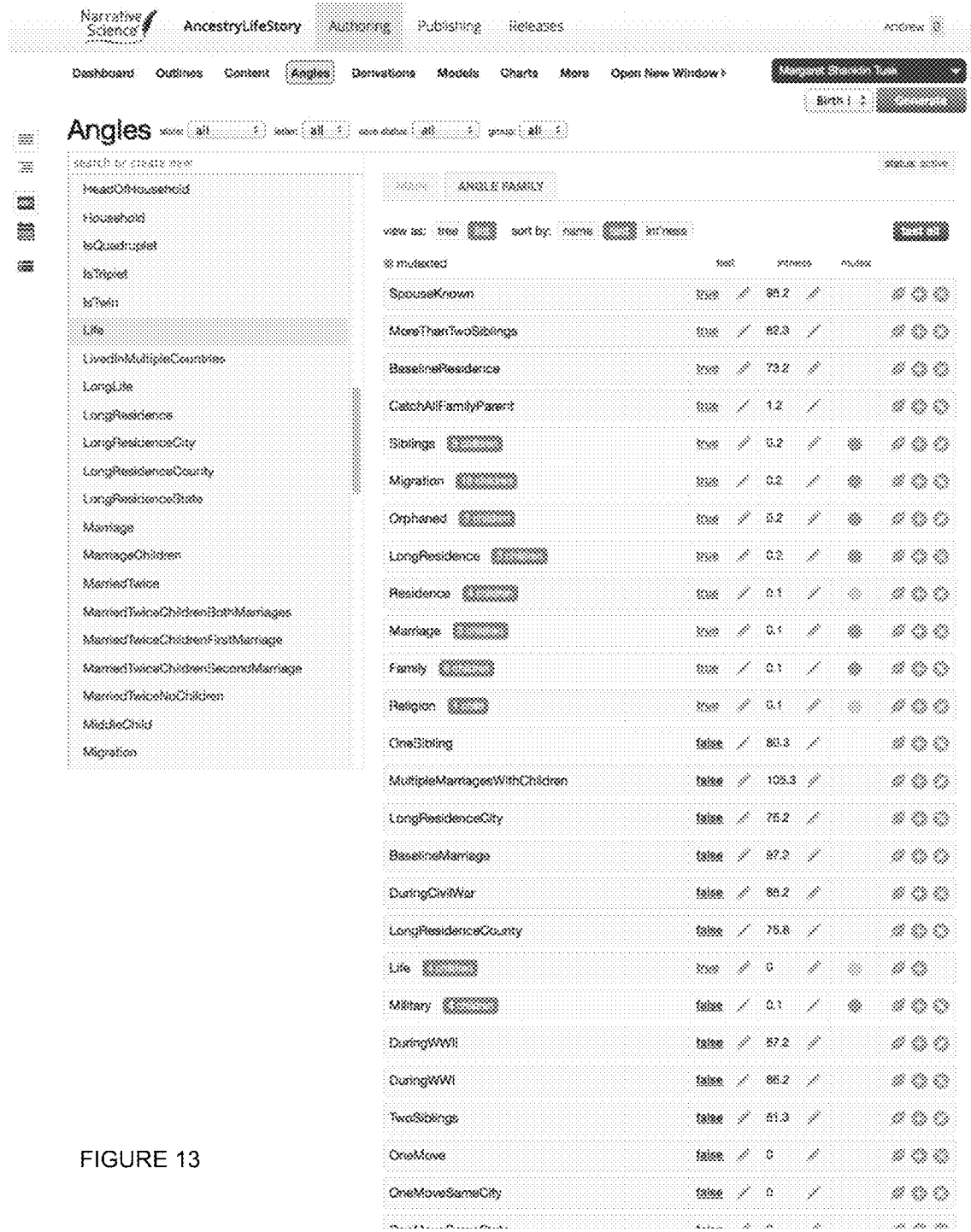
FIG. 13 illustrates how the Angles with true conditions sorted by interestingness according to an exemplary embodiment.
Figure 13:

FIG. 12 shows the same list, after the conditions of applicability have been tested on data determined by the user, which aids in finding errors in these conditions (those with true conditions are listed first). FIG. 13 additionally shows the Angles with true conditions sorted by interestingness, so that the Angle in this Angle family that would best characterize the selected data is shown at the top—again enabling the user to assess, incrementally, the current configuration of the Angles in this Angle family.

Figure 14:
FIG. 14 illustrates the Content Blocks associated with one of the parent Angles according to an exemplary embodiment.
Figure 14:
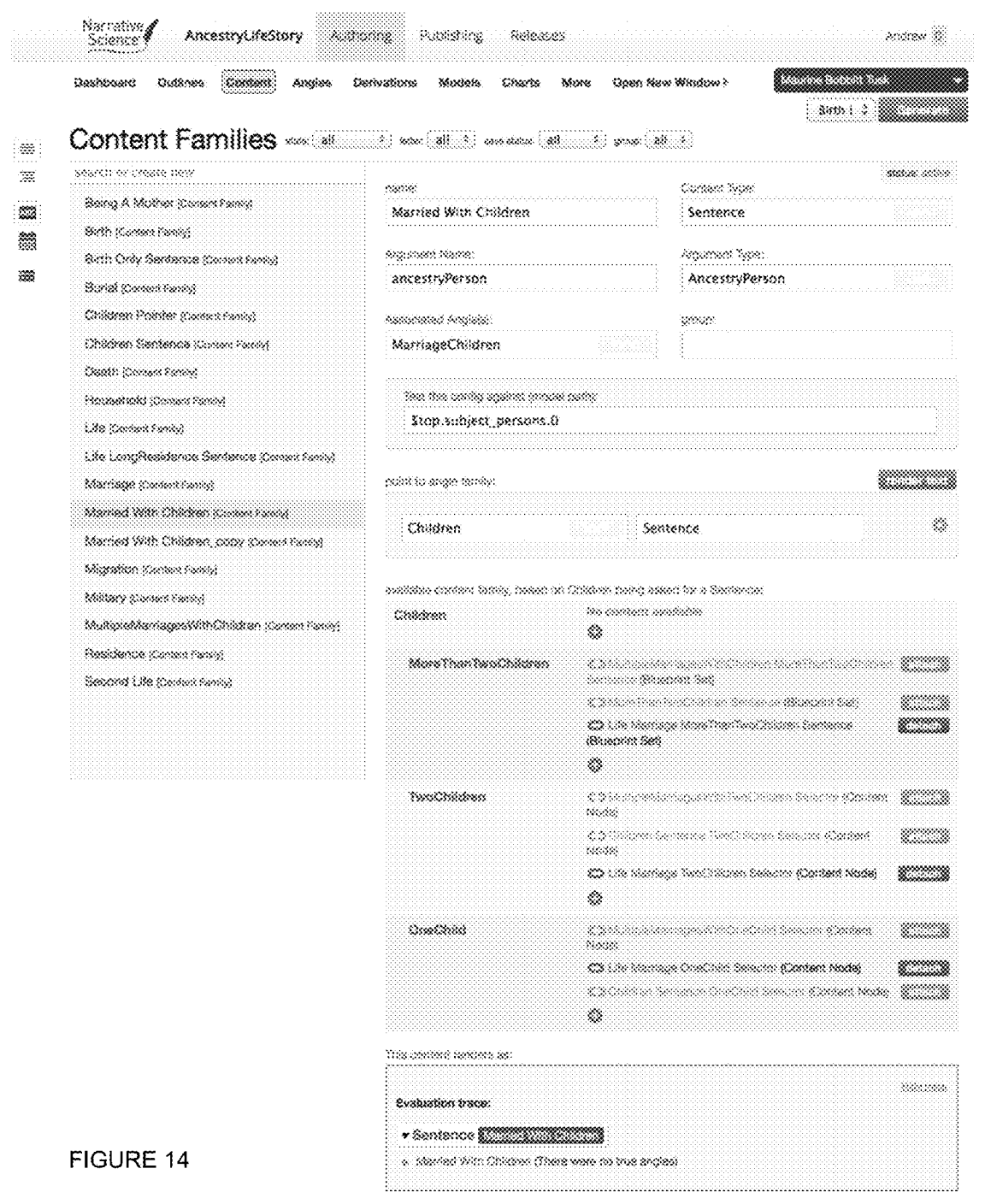
Figure 15:
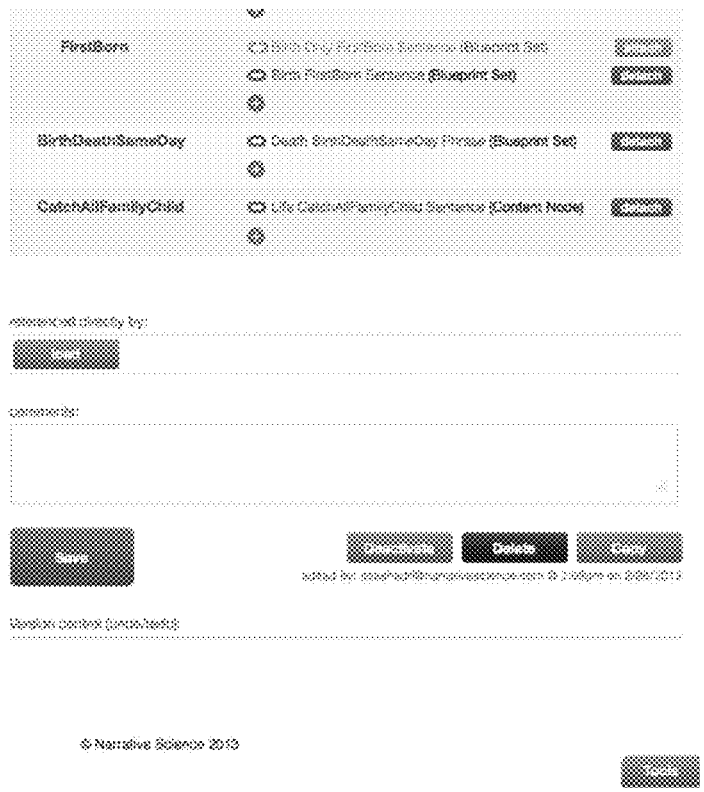
FIG. 15 illustrates another set of Content Blocks in expanded form according to an exemplary embodiment.

FIG. 14 displays the Content Blocks associated with one of the parent Angles previously displayed, specifically "MarriageChildren". These Content Blocks are associated with the individual Angles in that Angle family, which would apply depending on the conditions. The Content Blocks themselves contain other Content Blocks (which may be Content Nodes or Blueprint Sets); the user may edit the Content Blocks or add new Content Blocks if he or she believes that better or additional ways of expressing information associated with the specified Angle can be devised. The screen additionally indicates that no true Angle corresponding to this content is true given the selected data. FIG. 15 displays another set of Content Blocks in expanded form, so that all the content that might be expressed relating to the Angle in question can be viewed in context.

Figure 16:
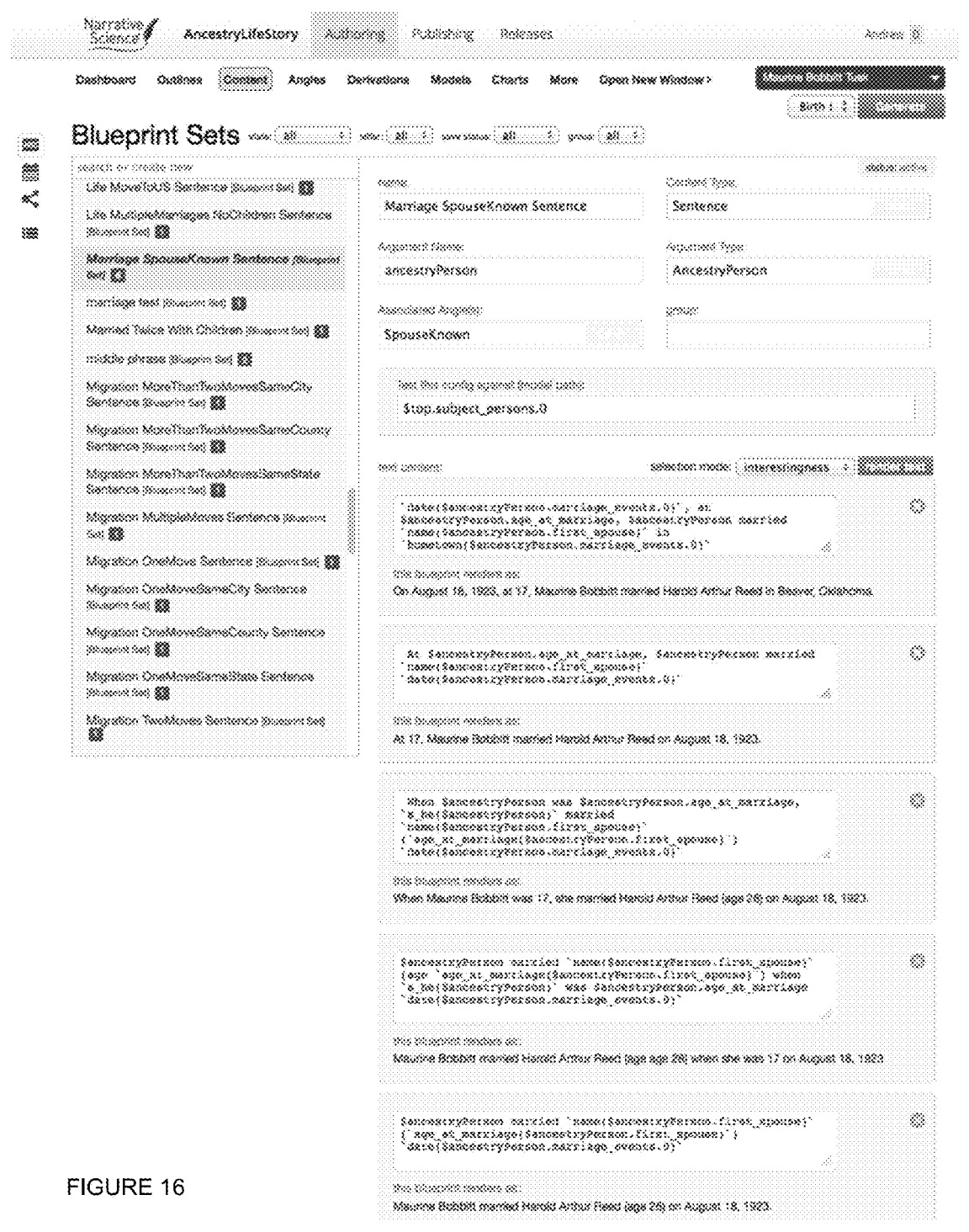
Figure 16:
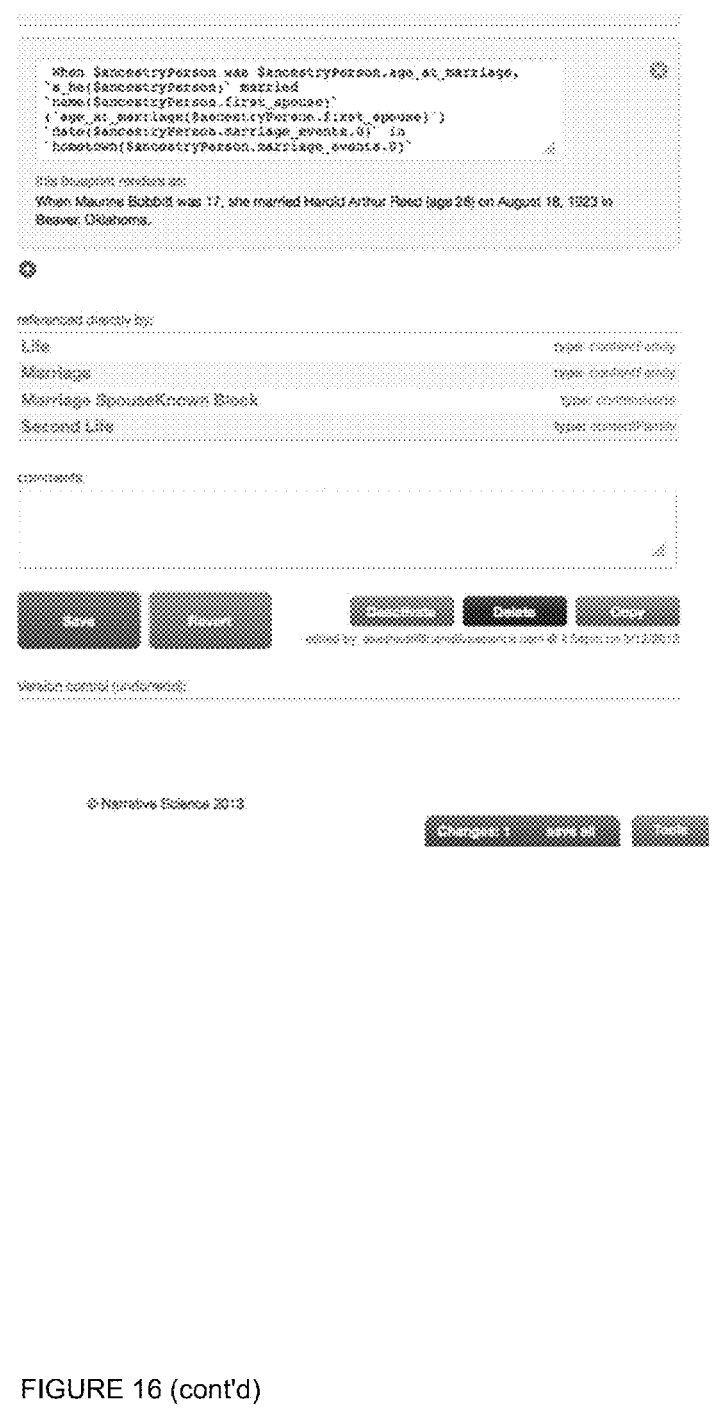
Figure 17:
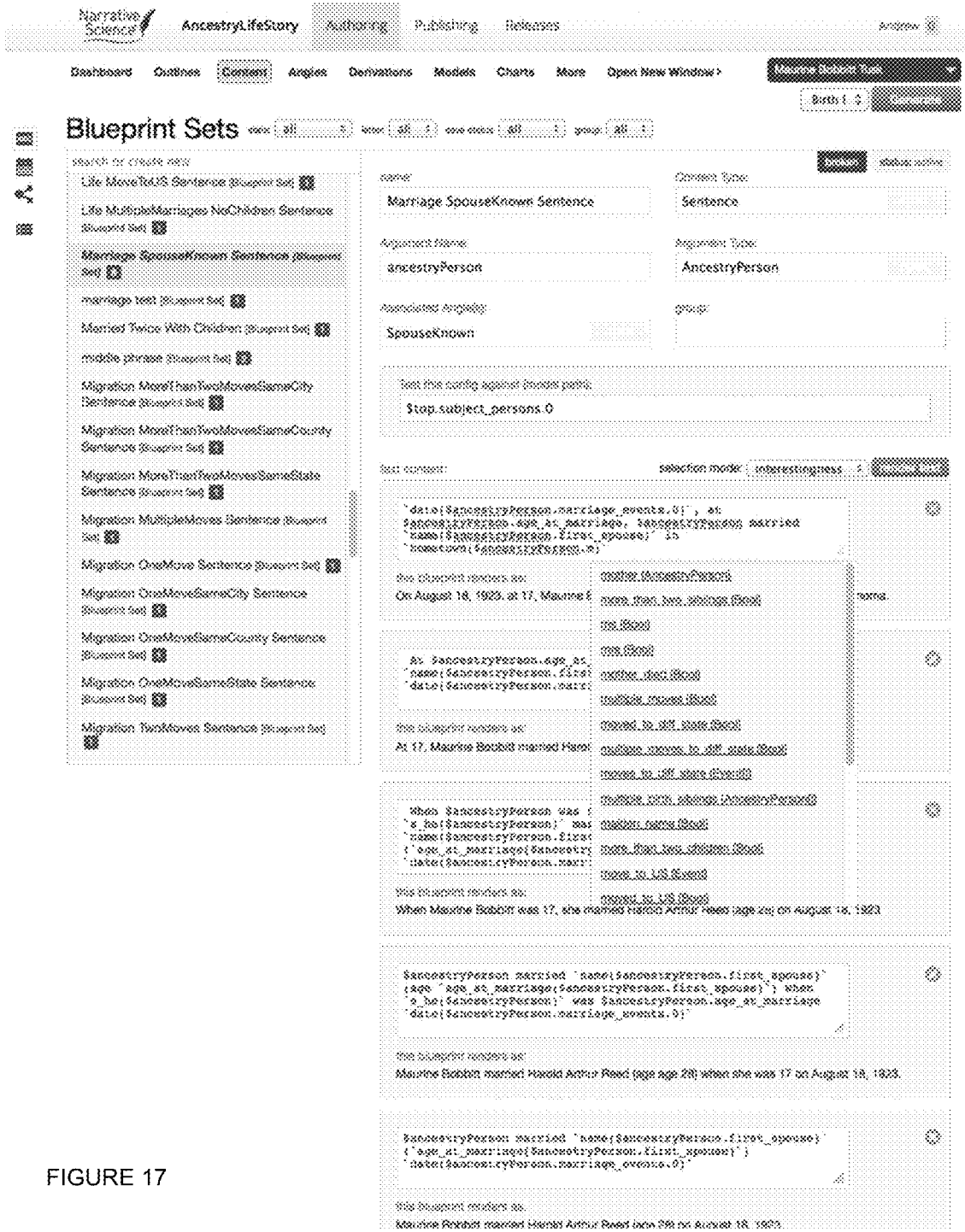
FIG. 17 illustrates a Blueprint Set with errors due to incorrect data references, along with suggestions by the system as to other data in the Models that the user might incorporate according to an exemplary embodiment.
Figure 17:

FIG. 16 shows a Blueprint Set including a series of alternative ways of expressing the facts relevant to a given Angle in a given Content Block, notated through a combination of fixed natural language words and phrases, path names referencing the data in the Models, and Phraseblocks (which in turn render as appropriate phrases depending on conditions). The user may add new Blueprints. The system also shows how these Blueprints would render as natural language expressions given the currently selected data, in order that they can be assessed for clarity, grammaticality, etc. FIG. 17 shows a similar Blueprint Set with errors due to incorrect data references, along with suggestions by the system as to other data in the Models that the user might incorporate instead.

Figure 18:
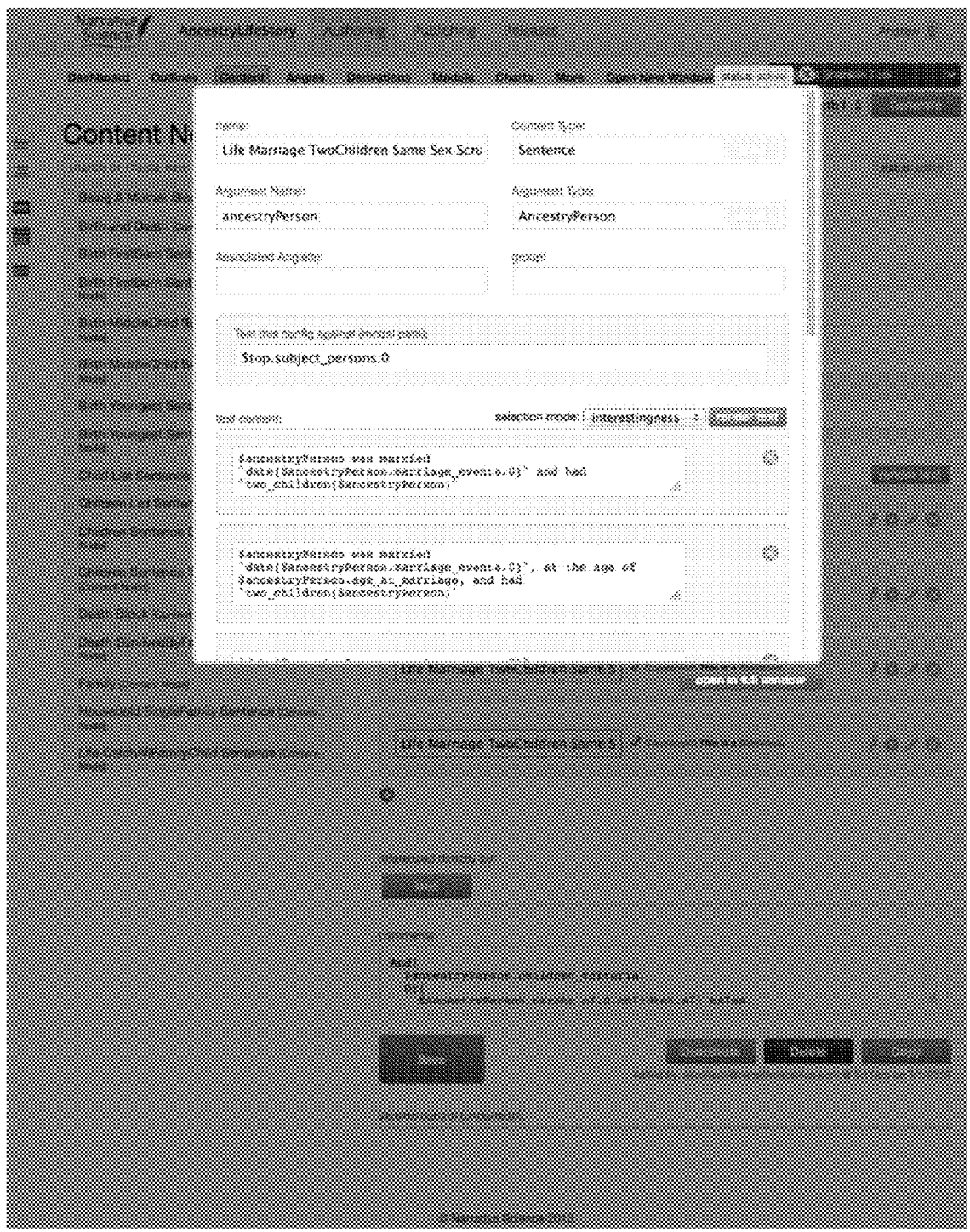
FIG. 18 illustrates general subordinate configuration elements that can be edited through modal dialog boxes according to an exemplary embodiment.

FIG. 18 shows that in general subordinate configuration elements can be edited through modal dialog boxes as well as direct navigation to a window displaying them. This enables easy refinement of these elements in the context of their use.

Figure 19:
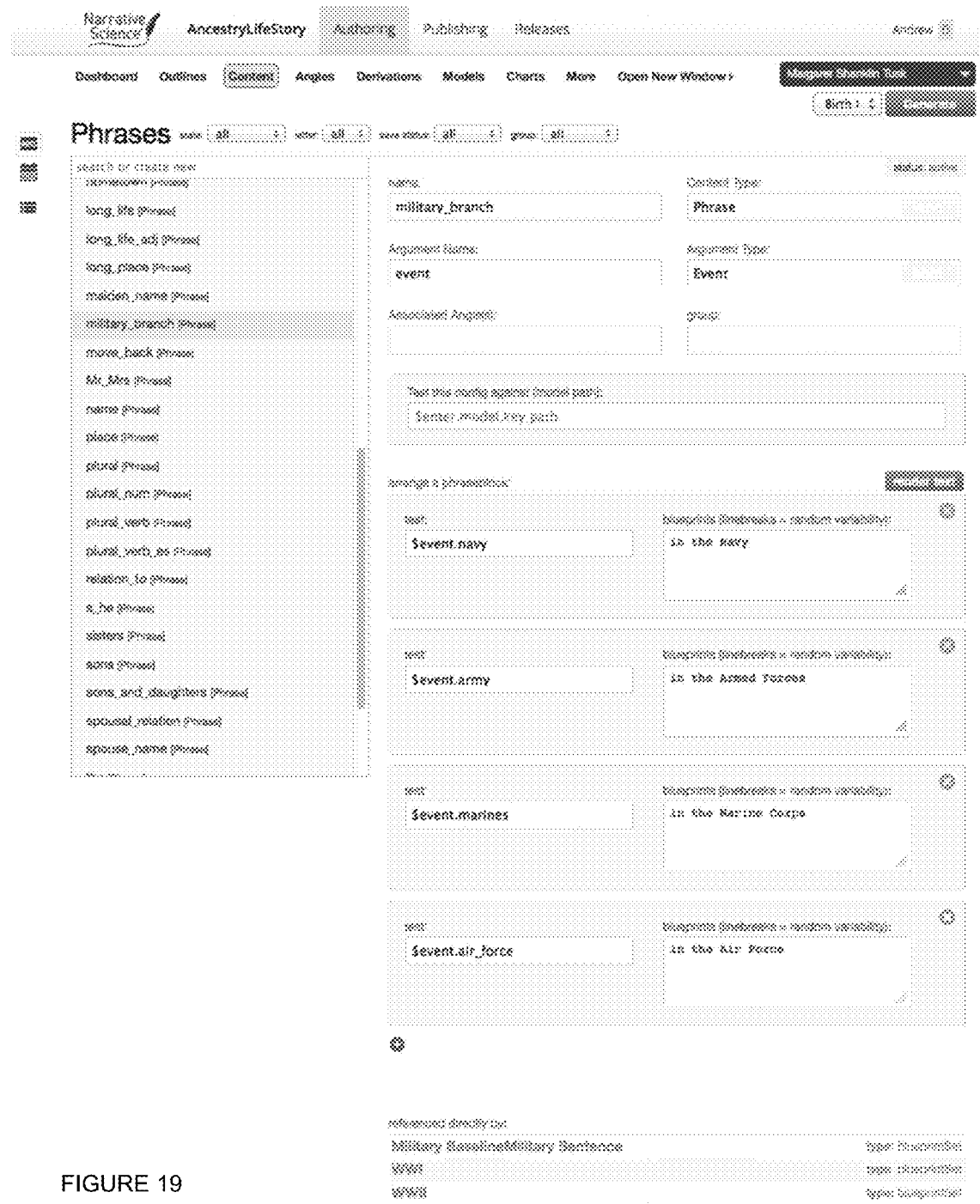
FIG. 19 illustrates the editing of Phraseblocks according to an exemplary embodiment.
Figure 19:
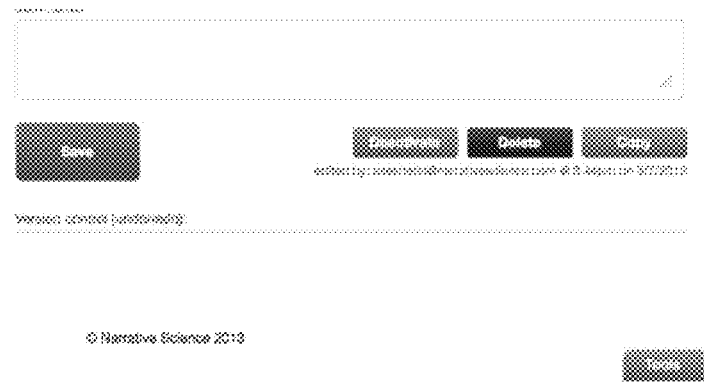
Figure 20:
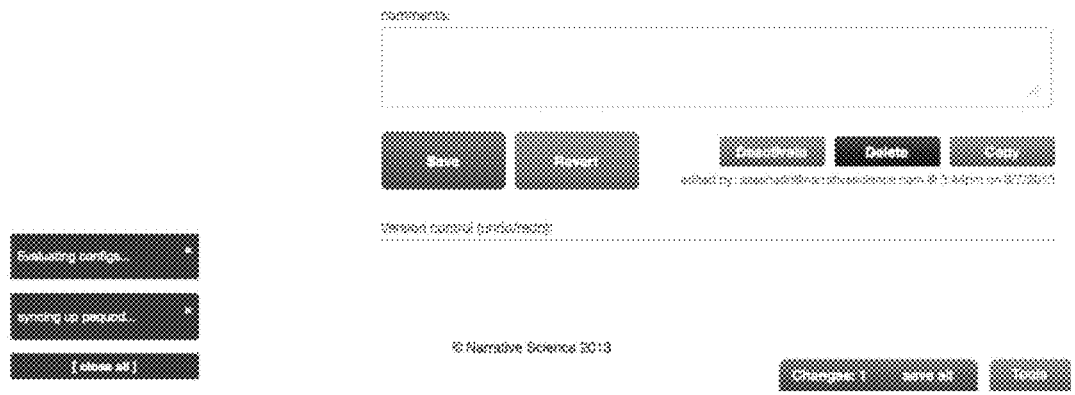
FIG. 20 illustrates the error message that would be generated if the configuration had an error in it according to an exemplary embodiment.

FIG. 19 shows the editing of Phraseblocks, which generate alternate phrases depending on conditions and can be incorporated into Blueprints. In this case for example, the Phraseblock generates different phrases to express the appropriate branch of the military in which the subject served. FIG. 20 shows the error message that would be generated if the configuration had an error in it so that it attempted to apply this Phraseblock to the wrong sort of data.

3. Providing Immediate Feedback During Configuration

As mentioned several times during the above discussion, a critical element of the method and system we have devised to support configuration is the ability to provide the user (editorial expert) with immediate feedback about the correctness (both syntactic and functional) of the configuration under development, and of the coherence and clarity of the result. This enables rapid and efficient iterative development and refinement of the configurations.

However to support this iterative development process, additional dataflow mechanisms must be developed beyond those required to generate stories from data on a production basis. In order to generate stories, the configurable narrative generation mechanism (or platform) must be given two inputs: One or more configurations, which determine the kinds of stories to be generated; and a flow of data about entities, events, situations, etc., which will be used as input to the configured mechanism in order to drive generation of stories about those entities, events, situations, etc., based on those data.

This is exactly what is required for a production workflow. For an iterative development workflow as described above, however, it does not suffice. Gaining feedback requires configuring the system, reading the data, generating the stories, and then examining the stories to see whether the configurations suffice—then changing the configurations if necessary and re-running the entire process again. Feedback on a more granular level—e.g., whether an individual Derivation or Blueprint appropriately configured—is not particularly easy in this approach.

In order to address this issue, the method and system for configuration that we have devised supports the relatively easy importation of sample data, and the evaluation of configuration elements on an individual basis using these sample data. This enables a much faster and more efficient configuration process from a user perspective.

Figure 21:
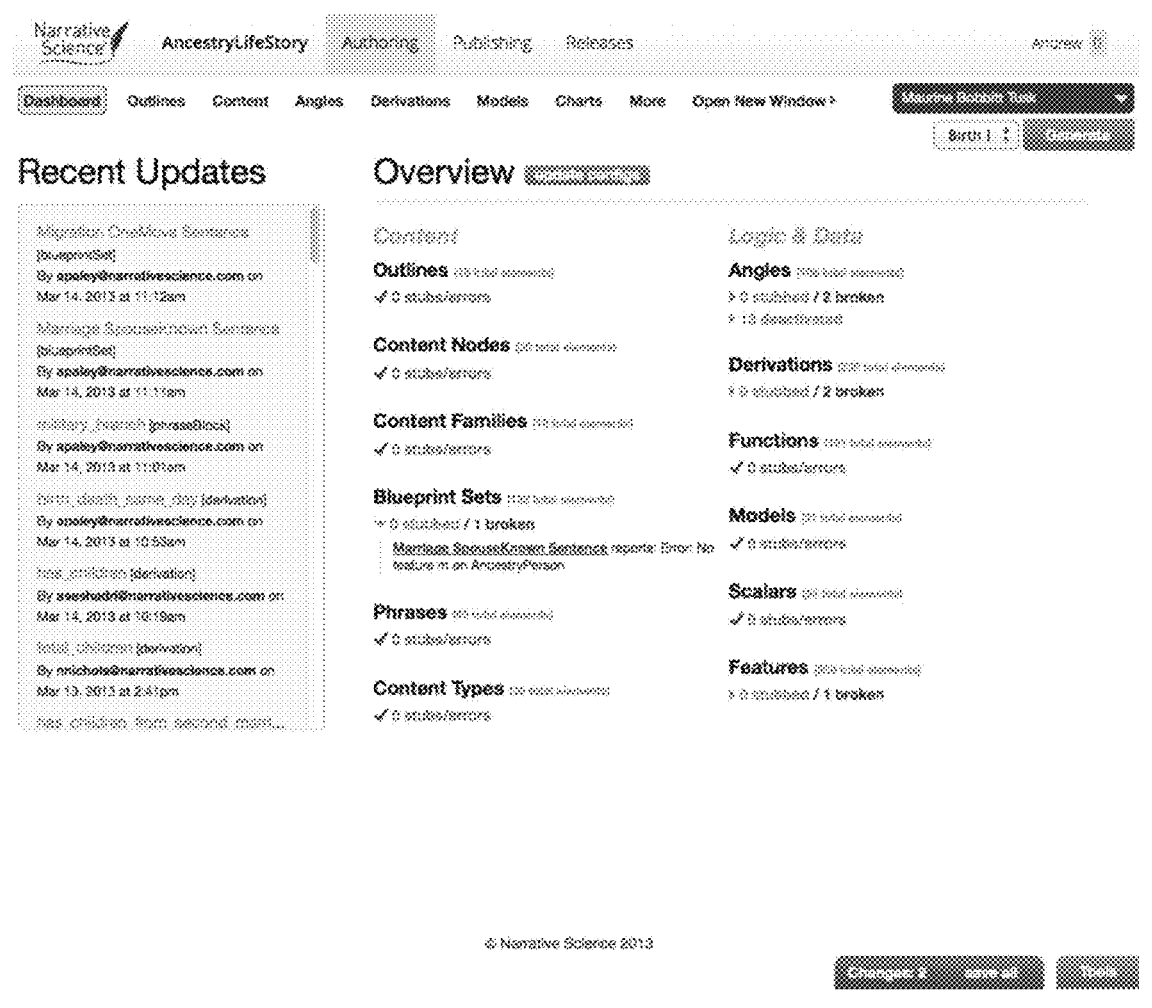
Figure 22:
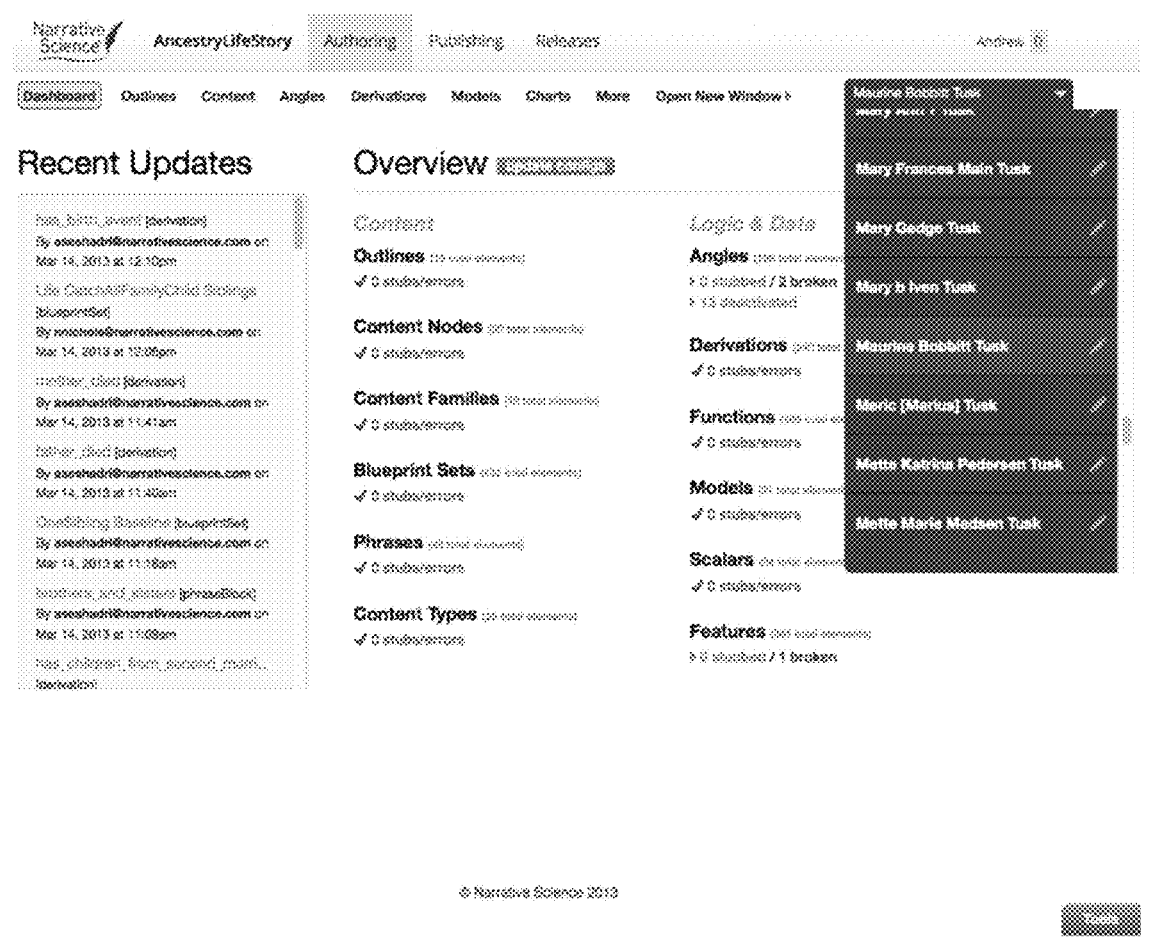
Figure 23:
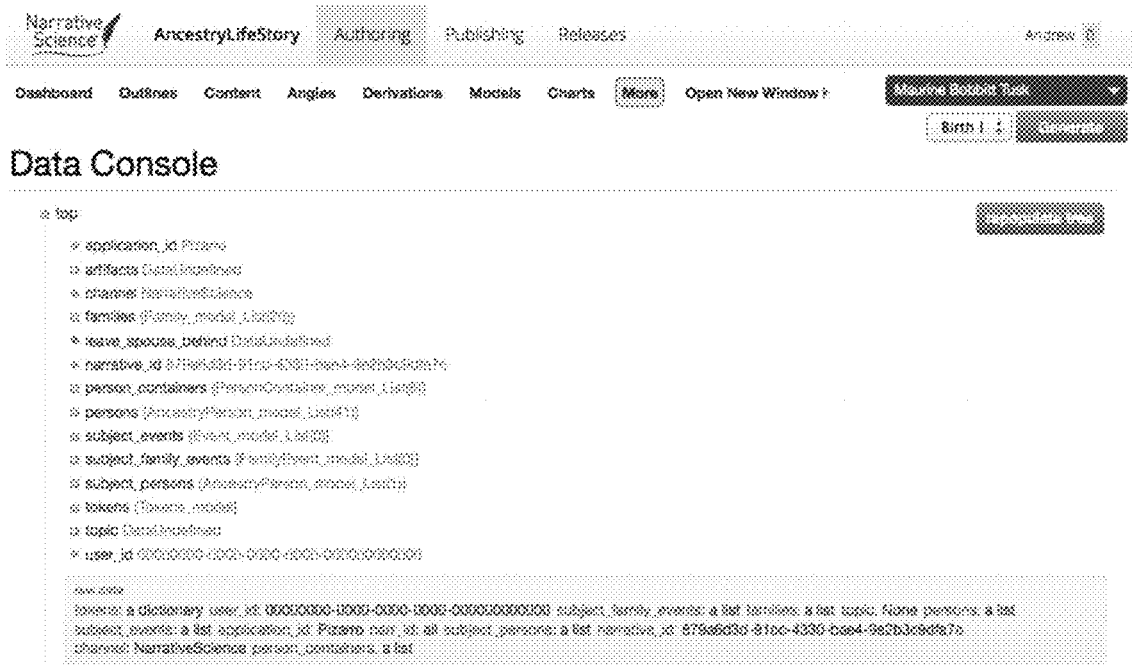
FIG. 23 illustrates a portion of a Model with sample data loaded into it according to an exemplary embodiment.

FIG. 21 shows the initial screen seen by a user upon returning to work on a configuration in progress. This screen shows the various configuration elements that have been developed already, as well as those which are entailed by previous elements but not yet developed. Most significant in the context of this discussion is the drop-down menu in the upper right hand corner labeled "Maurine Bobbit Tusk". This menu controls the importation of sample data (in this instance concerning a deceased individual named Maurine Bobbit). FIG. 22 shows that the configuration tool has currently been loaded with a number of different sets of sample data. The user is free to choose whichever data set will help to check and refine the configuration best in his or her judgment. FIG. 23 illustrates a portion of a Model with sample data loaded into it.

Figure 24:
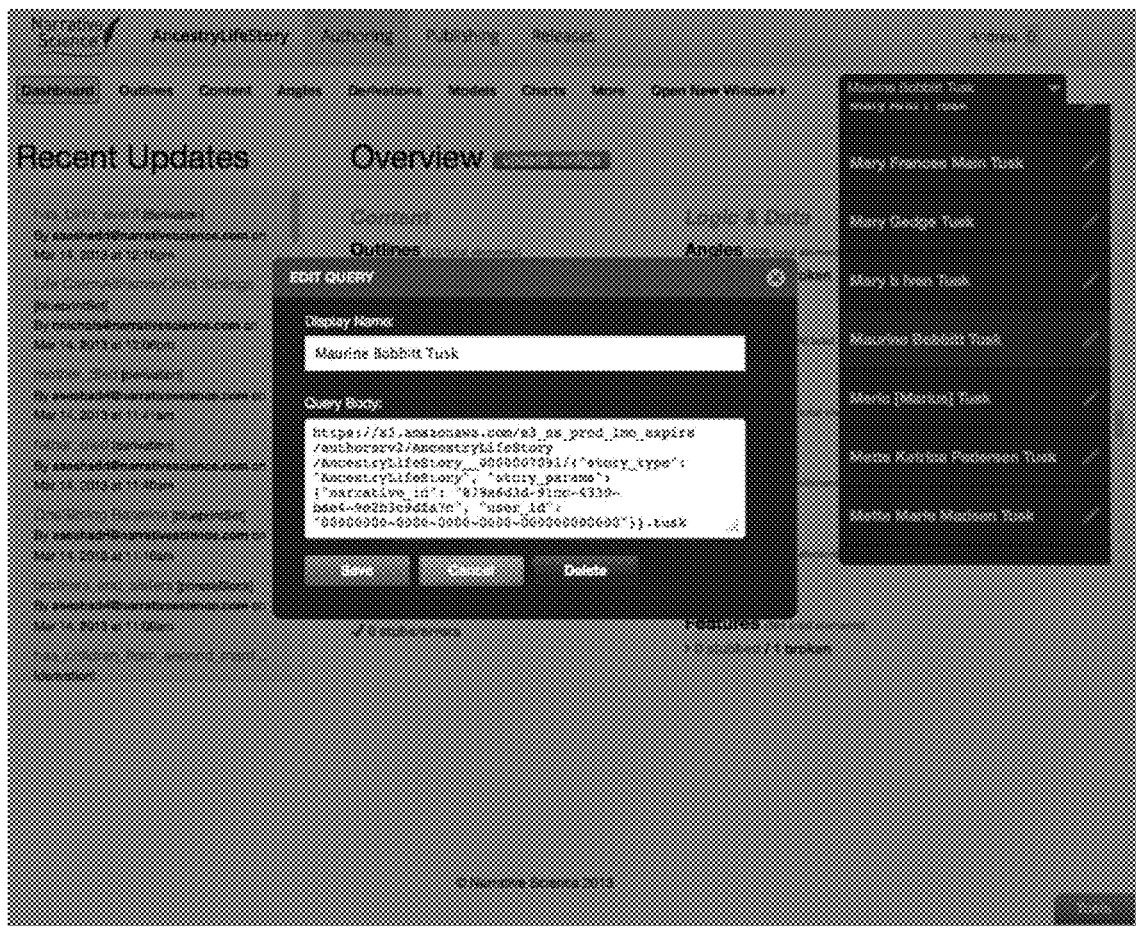
FIG. 24 illustrates the database query that has been written in order to import a sample data set according to an exemplary embodiment.

FIG. 24 shows the database query that has been written in order to import a sample data set. This query would typically be written by an engineer or with the aid of one, rather than the user (editorial expert) him or herself.

Figure 25:
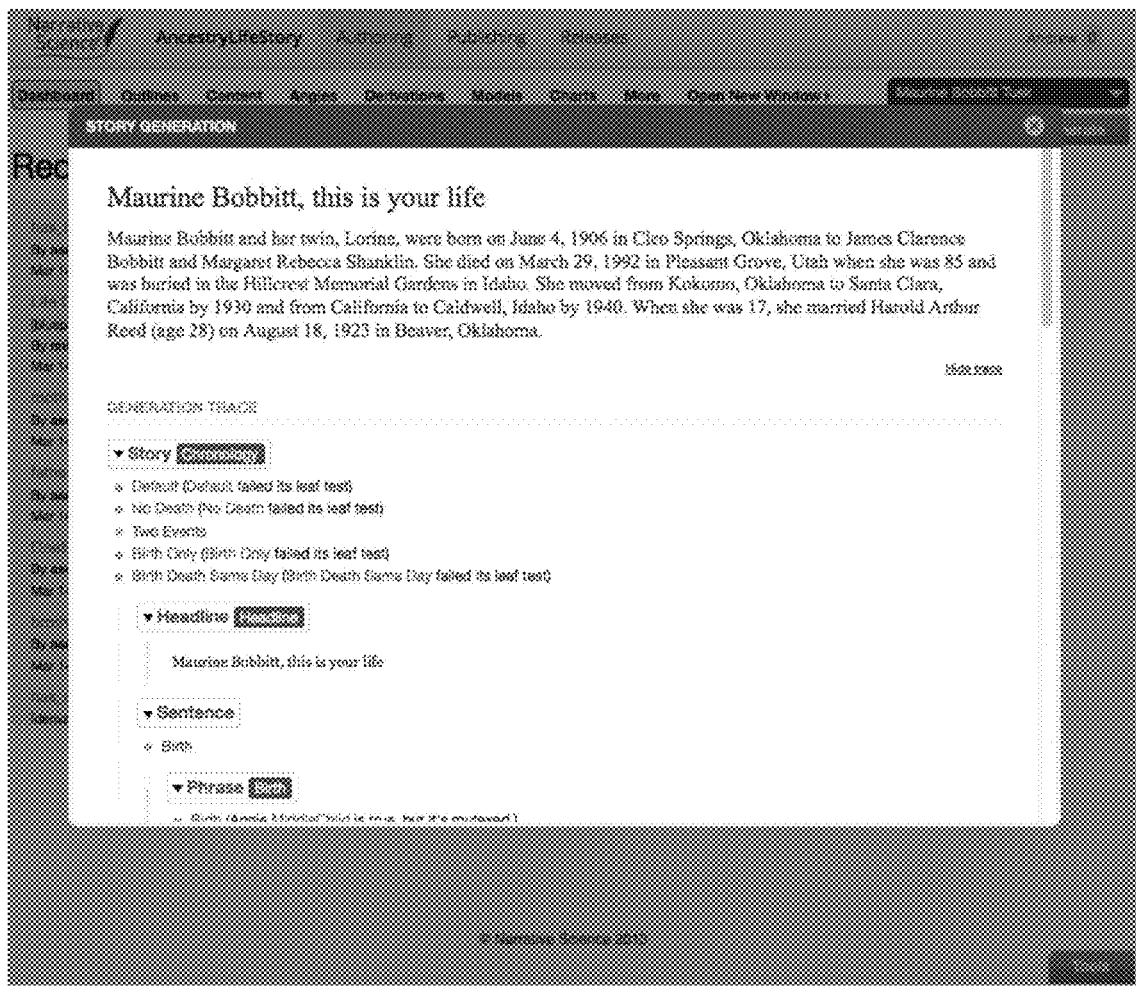
FIG. 25 illustrates an error messages and trace capabilities provide by the configuration tool when generating an entire story according to an exemplary embodiment.
Figure 26:
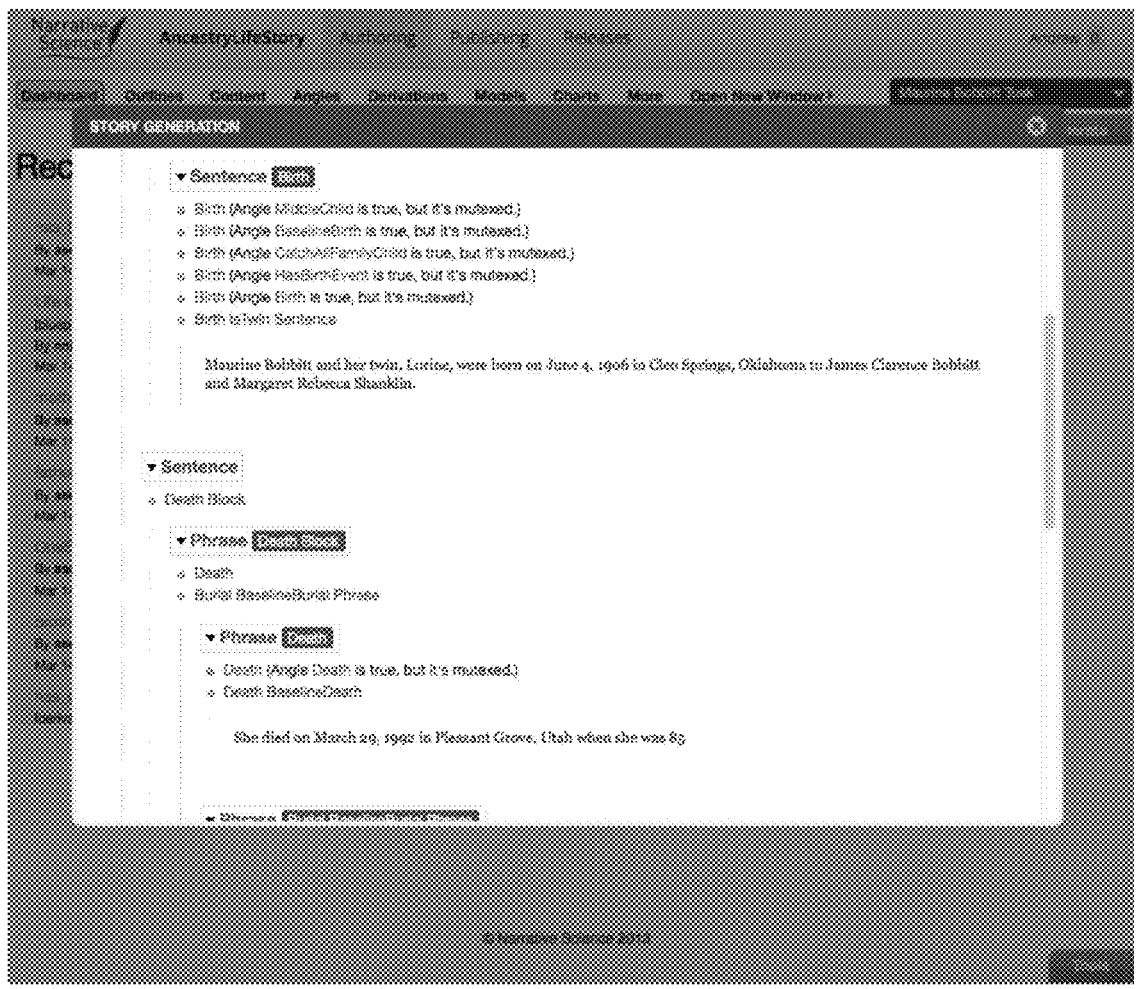
FIG. 26 illustrates an error messages and trace capabilities provide by the configuration tool when generating an entire story according to an exemplary embodiment.

Finally, while some incremental testing has been illustrated in the above description, FIGS. 25 and 26 illustrate the error messages and trace capabilities provide by the configuration tool when generating an entire story from start to end.

In sum, the ability to import sample data for direct use by the configuration tool itself, as described here, significantly improves the efficiency and effectiveness of the configuration process from the viewpoint of the human user developing the configurations.

While the present invention has been described above in relation to exemplary embodiments, various modifications may be made thereto that still fall within the invention's scope, as would be recognized by those of ordinary skill in the art. Such modifications to the invention will be recognizable upon review of the teachings herein. As such, the full scope of the present invention is to be defined solely by the appended claims and their legal equivalents.

What is claimed is:

1. An apparatus comprising:
a processor configured to generate a plurality of graphical user interfaces (GUIs) for interaction with a user to receive configuration input data from the user to support configuration of a narrative story generator, wherein the configuration comprises a plurality of configuration elements arranged in a hierarchy, wherein the configuration elements determine how the narrative story generator is to utilize input data in order to automatically generate a narrative story based on the input data, the configuration elements including a plurality of content blocks and a plurality of angles, and wherein the GUIs comprise a story outline GUI and an angle specification GUI;

wherein the angle specification GUI is configured to specify angles for the configuration elements in response to user configuration input, each angle corresponding to a characterization of data, wherein the user configuration input includes user input that defines an applicability condition test for an angle, and wherein the applicability condition test is configured to test whether the characterization for that angle is accurate with respect to the input data;

wherein the angle specification GUI includes an angle family GUI, wherein the angle family GUI is configured to list a plurality of the angles that are grouped into an angle family;

wherein the processor is further configured to perform an evaluation test of the angles of the angle family with respect to sample data in response to user input;

wherein the angle family GUI is further configured to identify, in response to the evaluation test, which of the angles were deemed true and false based on their respective applicability condition tests as applied to the sample data;

wherein the story outline GUI is configured to present content blocks comprising a story outline, wherein each of a plurality of the content blocks in the story outline is associated with a plurality of the configuration elements including an angle;

wherein the story outline GUI is further configured to be expandable to show the hierarchy of a plurality of the associated configuration elements of the content blocks via a hierarchical structure that uses indentations to show hierarchical relationships among the associated configuration elements including the angles;

wherein the processor is further configured to generate narrative stories based on the configuration and an analysis of the input data, wherein the analysis includes a testing of the input data against the defined applicability condition tests for the angles of the configuration to determine whether any of the characterizations corresponding to the angles serves as an accurate input data characterization that is to be included in the narrative story; and wherein the processor is further configured to (1) generate a test narrative story based on the configuration using imported sample data, (2) evaluate a plurality of the configuration elements with respect to the test narrative story and the imported sample data, and (3) based on the evaluation with respect to test narrative story and the imported sample data, provide feedback through at least one of the GUIs that indicates whether the configuration is able to correctly generate a narrative story from input data.

2. The apparatus of claim 1, wherein the processor is further configured to display additional GUIs illustrating errors or successful configuration of a plurality of configuration elements of the narrative story generator.

3. The apparatus of claim 1, wherein the GUIs display a navigation bar, the navigation bar displaying a plurality of configuration elements of the narrative story generator.

4. The apparatus of claim 3, wherein the configuration elements include outlines, content blocks, angles, models, and derivations.

5. The apparatus of claim 1, wherein at least one of the GUIs displays a function reference tool and at least one GUI displays a drop down menu illustrating suggested operations as a user types an operation within any field of the GUI.

6. The apparatus of claim 1, wherein the angle specification GUI is further configured to receive user configuration input that defines a data model for the data to be tested against the applicability condition test.

7. The apparatus of claim 6, wherein the angle specification GUI is further configured to receive user configuration input that defines interestingness values associated with the angles, each interestingness value for use by the narrative story generator to decide whether the characterization corresponding to its associated the angle is to be included in the narrative story when its associated the angle is deemed applicable to the input data.

8. The apparatus of claim 1, wherein the configuration elements further include a plurality of blueprints associated with the content blocks and the angles, wherein the blueprints are configured to parameterize how the characterizations corresponding to the angles are expressed as text, and wherein the story outline GUI is configured to show the hierarchy of angles and blueprints within a content block via indentations such that angles are indented from content blocks and blueprints are indented from angles blueprints.

9. The apparatus of claim 1, wherein the angle specification GUI is further configured to identify, for an angle, other configuration elements of the configuration that reference that angle.

10. The apparatus of claim 1, wherein the angles are associated with interestingness values, each interestingness value for use by the narrative story generator to decide whether the characterization corresponding to its associated angle is to be included in the narrative story when its associated angle is deemed applicable to the input data; and
wherein the angle family GUI is further configured to be sortable to sort the angles identified as true based on their associated interestingness values.

11. A method comprising:
generating a plurality of graphical user interfaces (GUIs) for interaction with a user to receive configuration input data from the user to support configuration of a narrative story generator, wherein the configuration comprises a plurality of configuration elements arranged in a hierarchy, wherein the configuration elements determine how the narrative story generator is to utilize input data in order to automatically generate a narrative story based on the input data, the configuration elements including a plurality of content blocks and a plurality of angles, and wherein the GUIs comprise a story outline GUI and an angle specification GUI;
the angle specification GUI specifying angles for the configuration elements in response to user configuration input, each angle corresponding to a characterization of data, wherein the user configuration input includes user input that defines an applicability condition test for an angle, and wherein the applicability condition test is configured to test whether the characterization for that angle is accurate with respect to the input data, wherein the angle specification GUI includes an angle family GUI;
the angle family GUI listing a plurality of the angles that are grouped into an angle family;
performing an evaluation test of the angles of the angle family with respect to sample data in response to user input; and
the angle family GUI identifying, in response to the evaluation test, which of the angles were deemed true and false based on their respective applicability condition tests as applied to the sample data;
the story outline GUI presenting content blocks comprising a story outline wherein each of a plurality of the content blocks in the story outline is associated with a plurality of the configuration elements including an angle;
the story outline GUI expanding the story outline in response to user input to show the hierarchy of a plurality of the associated configuration elements of the content blocks via a hierarchical structure that uses indentations to show hierarchical relationships among the associated configuration elements including the angles;
receiving configuration inputs from the user through the outline GUI and the angle specification GUI to determine the configuration for the narrative story generator;
generating a test narrative story based on the configuration using imported sample data;
evaluating a plurality of the configuration elements with respect to the test narrative story and the imported sample data;
based on the evaluation with respect to test narrative story and the imported sample data, providing feedback through at least one of the GUIs that indicates whether the configuration is able to correctly generate a narrative story from input data; and
generating a narrative story based on the evaluated configuration of the narrative story generator and an analysis of the input data, wherein analysis includes testing the input data against the defined applicability condition tests for the angles of the configuration to determine whether any of the characterizations corresponding to the angles serves as an accurate input data characterization that is to be included in the narrative story;
wherein the method steps are performed by a processor.

12. The method of claim 11, wherein the processor is further configured to display additional GUIs illustrating errors or successful configuration of a plurality of configuration elements of the narrative story generator.

13. The method of claim 11, wherein the GUIs display a navigation bar, the navigation bar displaying a plurality of configuration elements of the narrative story generator.

14. The method of claim 13, wherein the configuration elements include outlines, content blocks, angles, models, and derivations.

15. The apparatus of claim 11, wherein at least one of the GUIs displays a function reference tool and at least one GUI displays a drop down menu illustrating suggested operations as a user types an operation within any field of the GUI.

16. The method of claim 11, further comprising the angle specification GUI receiving user configuration input that defines a data model for the data to be tested against the applicability condition test.

17. The method of claim 16, further comprising the angle specification GUI receiving user configuration input that defines interestingness values associated with for the angles, each the interestingness value for use by the narrative story generator to decide whether the characterization corresponding to its associated angle is to be included in the narrative story when its associated angle is deemed applicable to the input data.

18. The method of claim 11, wherein the configuration elements further include a plurality of blueprints associated with the content blocks and the angles, wherein the blueprints are configured to parameterize how the characterizations corresponding to the angles are expressed as text, and wherein the expanded story outline GUI shows the hierarchy of angles and blueprints within a content block via indentations such that angles are indented from content blocks and blueprints are indented from angles.

19. The method of claim 11, further comprising the angle specification GUI identifying, for an angle, other configuration elements of the configuration that reference that angle.

20. The method of claim 11, wherein the angles are associated with interestingness values, each interestingness value for use by the narrative story generator to decide whether the characterization corresponding to its associated angle is to be included in the narrative story when its associated angle is deemed applicable to the input data, and wherein the method further comprises:
the angle family GUI sorting the angles identified as true based on their associated interestingness values.

21. A computer program product comprising:
a plurality of instructions executable by a processor and resident on a non-transitory computer-readable storage medium, wherein the instructions, upon execution by the processor, are configured to generate a plurality of graphical user interfaces (GUIs) for interaction with a user to receive configuration input data from the user to support configuration of a narrative story generator, wherein the configuration comprises a plurality of configuration elements arranged in a hierarchy, wherein the configuration elements determine how the narrative story generator is to utilize input data in order to automatically generate a narrative story based on the input data, the configuration elements including a plurality of content blocks and a plurality of angles, and wherein the GUIs comprise a story outline GUI and an angle specification GUI;
wherein the angle specification GUI is configured to specify angles for the configuration elements in response to user configuration input, each angle corresponding to a characterization of data, wherein the user configuration input includes user input that defines an applicability condition test for an angle, and wherein the applicability condition test is configured to test whether the characterization for that angle is accurate with respect to the input data;
wherein the angle specification GUI includes an angle family GUI, wherein the angle family GUI is configured to list a plurality of the angles that are grouped into an angle family;
wherein the processor is further configured to perform an evaluation test of the angles of the angle family with respect to sample data in response to user input;
wherein the angle family GUI is further configured to identify, in response to the evaluation test, which of the angles were deemed true and false based on their respective applicability condition tests as applied to the sample data;
wherein the story outline GUI is configured present content blocks comprising a story outline, wherein each of a plurality of the content blocks in the story outline is associated with a plurality of the configuration elements including an angle;
wherein the story outline GUI is further configured to be expandable to show the hierarchy of a plurality of the associated configuration elements of the content blocks via a hierarchical structure that uses indentations to show hierarchical relationships among the associated configuration elements including the angles;
wherein the instructions, upon execution by the processor, are further configured to generate narrative stories based on the configuration and an analysis of the input data, wherein the analysis includes a testing of the input data against the defined applicability condition tests for the angles of the configuration to determine whether any of the characterizations corresponding to the angles serves as an accurate input data characterization that is to be included in the narrative story; and
wherein the instructions, upon execution by the processor, are further configured to (1) generate a test narrative story based on the configuration using imported sample data, (2) evaluate a plurality of the configuration elements with respect to the test narrative story and the imported sample data, and (3) based on the evaluation with respect to test narrative story and the imported sample data, provide feedback through at least one of the GUIs that indicates whether the configuration is able to correctly generate a narrative story from input data.

22. The apparatus of claim 1, wherein the GUIs further comprise a model specification GUI that is configured to receive user configuration input that defines a data model for the input data that is to be analyzed by the narrative story generator in accordance with the configuration, wherein the defined data model serves as one of the configuration elements.

23. The apparatus of claim 22, wherein the GUIs further comprise a derivation specification GUI that is configured to receive user configuration input that defines a derivation to be computed from the input data, the derivation for analysis by the narrative story generator in accordance with the configuration, wherein the defined derivation serves as one of the configuration elements.

24. The method of claim 11, the GUIs further comprise a model specification GUI that is configured to receive user configuration input that defines a data model for the input data that is to be analyzed by the narrative story generator in accordance with the configuration, the method further comprising:
receiving configuration input from the user through the model specification GUI to define the configuration for the narrative story generator, wherein the defined data model serves as one of the configuration elements.

25. The method of claim 24, wherein the GUIs further comprise a derivation specification GUI that is configured to receive user configuration input that defines a derivation to be computed from the input data, the derivation for analysis by the narrative story generator in accordance with the configuration, the method further comprising:
receiving configuration input from the user through the derivation specification GUI to define the configuration for the narrative story generator, wherein the defined derivation serves as one of the configuration elements.

26. The apparatus of claim 23, wherein the GUIs further comprise a generation trace GUI that is configured to provide the feedback, wherein the generation trace GUI is configured to display a trace that shows how the configuration elements, including a defined data model and a defined derivation, were applied to the imported sample data.

27. The apparatus of claim 26, wherein the trace includes a display of which configuration elements were deemed true with respect to the sample data, including a display of which of the angles of the configuration were deemed true in view of their applicability condition tests as applied to the sample data.

28. The apparatus of claim 23, wherein at least one of the GUIs is configured to (1) receive a partial user entry for a term of one of the configuration elements, (2) in response to the received partial user entry, automatically suggest at least one completed term for the received partial user entry, (3) receive a user selection of a suggested completed term, and (4) include the user selection as part of the configuration elements.

29. The method of claim 25, wherein the GUIs further comprise a generation trace GUI, and wherein the feedback providing step comprises the generation trace GUI providing a trace that shows how the configuration elements, including a defined data model and a defined derivation, were applied to the imported sample data.

30. The method of claim 29, wherein the trace includes a display of which configuration elements were deemed true with respect to the sample data, including a display of which of the angles of the configuration were deemed true in view of their applicability condition tests as applied to the sample data.

31. The method of claim 25, wherein configuration input receiving step further comprises a processor (1) receiving, via at least one of the GUIs, a partial user entry for a term of one of the configuration elements, (2) in response to the received partial user entry, automatically suggest, via the at least one GUI, at least one completed term for the received partial user entry, (3) receiving a user selection of a suggested completed term, and (4) including the user selection as part of the configuration elements.

32. The apparatus of claim 23, wherein the GUIs are navigable in response to user input via a plurality of different sequences, the sequences including a top-down sequence that begins with the story outline GUI and a bottom-up sequence that begins with the model specification GUI.

33. The method of claim 24, further comprising the processor navigating among the GUIs in response to user input via a plurality of different sequences, the sequences including a top-down sequence that begins with the story outline GUI and a bottom-up sequence that begins with the model specification GUI.

\* \* \* \* \*